(12) United States Patent
Miller, Jr. et al.

(10) Patent No.: US 8,487,484 B1
(45) Date of Patent: Jul. 16, 2013

(54) PERMANENT MAGNET DRIVE APPARATUS AND OPERATIONAL METHOD

(75) Inventors: Harold L. Miller, Jr., St. Augustine, FL (US); Andrew E. Colson, Jr., Watchung, NJ (US)

(73) Assignee: Torque Multipliers, LLC, Watchung, NJ (US)

( * ) Notice: Subject to any disclaimer, the term of this patent is extended or adjusted under 35 U.S.C. 154(b) by 0 days.

(21) Appl. No.: 13/421,219

(22) Filed: Mar. 15, 2012

(51) Int. Cl.
*H02K 41/02* (2006.01)

(52) U.S. Cl.
USPC ............... 310/12.14; 310/12.15; 310/15

(58) Field of Classification Search
USPC .................. 310/12.14–12.15, 13–15, 103, 80
See application file for complete search history.

(56) References Cited

U.S. PATENT DOCUMENTS

| | | | |
|---|---|---|---|
| 322,296 A | 7/1885 | Knabe, Jr. | |
| 1,724,446 A | 8/1929 | Worthington | |
| 2,790,095 A * | 4/1957 | Peek et al. | 310/103 |
| 2,943,216 A * | 6/1960 | Spodig | 310/103 |
| 3,328,615 A | 6/1967 | Bakker et al. | |
| 3,331,973 A | 7/1967 | McClure | |
| 3,470,403 A | 9/1969 | Bey | |
| 3,484,629 A | 12/1969 | Kunz | |
| 3,609,425 A | 9/1971 | Sheridan | |
| 3,636,391 A | 1/1972 | Horner et al. | |
| 3,703,653 A | 11/1972 | Tracy et al. | |
| 3,811,058 A | 5/1974 | Kiniski | |
| 3,899,703 A * | 8/1975 | Kinnison | 310/103 |
| 3,967,146 A * | 6/1976 | Howard | 310/80 |
| 4,011,477 A * | 3/1977 | Scholin | 310/80 |
| 4,019,103 A | 4/1977 | Davis et al. | |
| 4,082,969 A | 4/1978 | Kelly | |
| 4,151,431 A | 4/1979 | Johnson | |
| 4,167,684 A | 9/1979 | Kelly | |
| 4,179,633 A | 12/1979 | Kelly | |
| 4,196,365 A * | 4/1980 | Presley | 310/23 |
| 4,267,647 A * | 5/1981 | Anderson et al. | 434/301 |
| 4,359,673 A | 11/1982 | Bross, Jr. et al. | |
| 4,371,798 A | 2/1983 | Kuroda | |

(Continued)

FOREIGN PATENT DOCUMENTS

| | | |
|---|---|---|
| CA | 2595229 A1 | 8/2006 |
| CN | 1082264 A | 2/1994 |

(Continued)

OTHER PUBLICATIONS

J. Hypla, "Amazing Magnet-Powered Motor", Science & Mechanics, Spring 1980, 9 pages.

*Primary Examiner* — Thanh Lam
(74) *Attorney, Agent, or Firm* — Walter W. Duft

(57) ABSTRACT

A magnetic drive apparatus includes first and second magnet carriers carrying first and second permanent magnet arrangements. An intermediate magnet carrier disposed between the first and second magnet carriers carries a third permanent magnet arrangement. The magnet carriers are arranged for rotation relative to each other such that the magnet arrangements produce magnetic interactions that result in power stroke forces causing the magnet carriers to undergo relative reciprocation in first and second stroke directions during power zone portions of the relative rotation. The magnetic interactions impart substantially no power stroke forces during dead zone portions of the relative rotation. The dead zones include magnet carrier relative rotation positions wherein opposing magnetic poles are mutually coaxially aligned but produce a substantially equal balance of push and pull magnetic forces. The apparatus may be synchronized so that the dead zones coincide with top dead center and bottom dead center relative reciprocation positions.

25 Claims, 18 Drawing Sheets

U.S. PATENT DOCUMENTS

| | | | |
|---|---|---|---|
| 4,404,503 | A | 9/1983 | Ward et al. |
| 4,507,579 | A | 3/1985 | Turner |
| 4,631,455 | A | 12/1986 | Taishoff |
| 4,877,983 | A | 10/1989 | Johnson |
| 4,937,481 | A | 6/1990 | Vitale |
| 5,036,930 | A | 8/1991 | Bisel et al. |
| 5,057,724 | A | 10/1991 | Patton |
| 5,219,034 | A | 6/1993 | Wortham |
| 5,457,349 | A | 10/1995 | Gifford |
| 5,592,036 | A | 1/1997 | Pino |
| 5,594,289 | A * | 1/1997 | Minato .......... 310/152 |
| 5,886,442 | A | 3/1999 | Ogino et al. |
| 5,903,069 | A * | 5/1999 | Hiterer .......... 310/15 |
| 6,169,343 | B1 * | 1/2001 | Rich, Sr. .......... 310/15 |
| 6,274,959 | B1 | 8/2001 | Uchiyama |
| 6,552,450 | B2 | 4/2003 | Harty et al. |
| 6,700,248 | B2 * | 3/2004 | Long .......... 310/80 |
| 6,747,376 | B2 | 6/2004 | Hashimoto et al. |
| 6,803,682 | B1 | 10/2004 | Thirunarayan et al. |
| 7,049,720 | B2 | 5/2006 | Darday |
| 7,151,332 | B2 | 12/2006 | Kundel |
| 7,233,088 | B2 | 6/2007 | Wise |
| 7,382,106 | B2 | 6/2008 | Kundel |
| 7,400,069 | B2 | 7/2008 | Kundel |
| 7,446,440 | B2 | 11/2008 | Mihajlovic |
| 7,482,721 | B2 | 1/2009 | Kobayashi |
| 2002/0047411 | A1 | 4/2002 | Mo |
| 2002/0121815 | A1 | 9/2002 | Sullivan |
| 2004/0183387 | A1 * | 9/2004 | Moe .......... 310/152 |
| 2006/0071561 | A1 | 4/2006 | Chiu et al. |
| 2006/0131887 | A1 | 6/2006 | Gosvener |
| 2006/0244316 | A1 | 11/2006 | Kundel |
| 2006/0273666 | A1 | 12/2006 | Mihajlovic |
| 2008/0122299 | A1 | 5/2008 | Cristoforo et al. |
| 2010/0308601 | A1 | 12/2010 | Walden |

FOREIGN PATENT DOCUMENTS

| | | |
|---|---|---|
| CN | 1367574 A | 9/2002 |
| CN | 101578754 A | 11/2009 |
| DE | 3117377 A1 | 12/1982 |
| DE | 19850314 A1 | 11/2000 |
| FR | 2617654 A1 | 1/1989 |
| FR | 2867630 A1 | 9/2005 |
| GB | 550249 | 12/1942 |
| GB | 747727 | 4/1956 |
| GB | 2109478 A | 6/1983 |
| GB | 2471545 | 5/2011 |
| JP | 3089877 A | 4/1991 |
| JP | 2003113923 | 4/2003 |
| KR | 100758670 B1 | 9/2007 |
| KR | 20080085486 A | 9/2008 |
| NL | 1027086 C1 | 3/2006 |
| RU | 2177201 C1 | 12/2001 |
| RU | 2206169 C2 | 6/2003 |
| WO | WO8203894 A1 | 11/1982 |
| WO | WO2006084232 A2 | 8/2006 |
| WO | WO2009088144 A1 | 7/2009 |

* cited by examiner

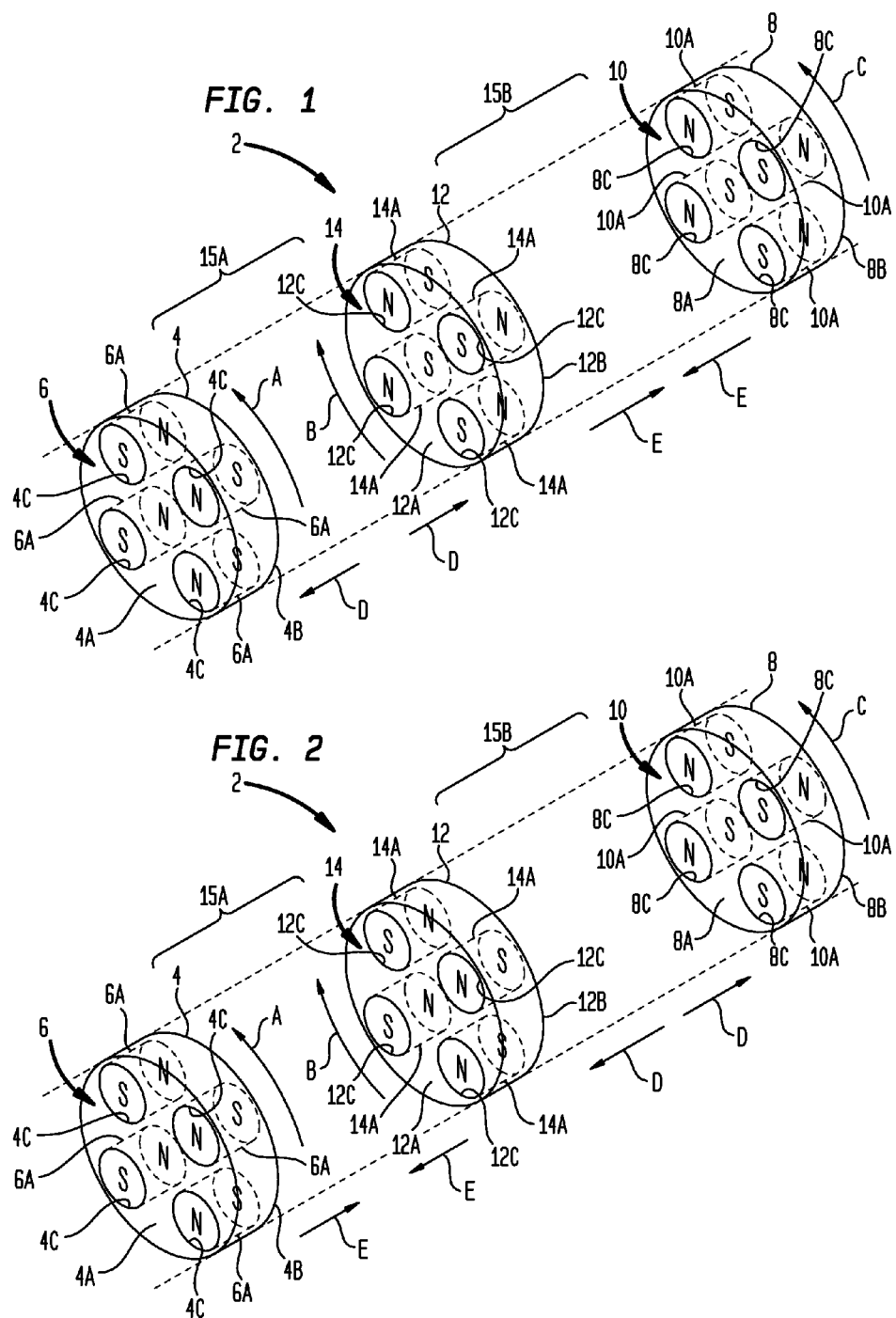

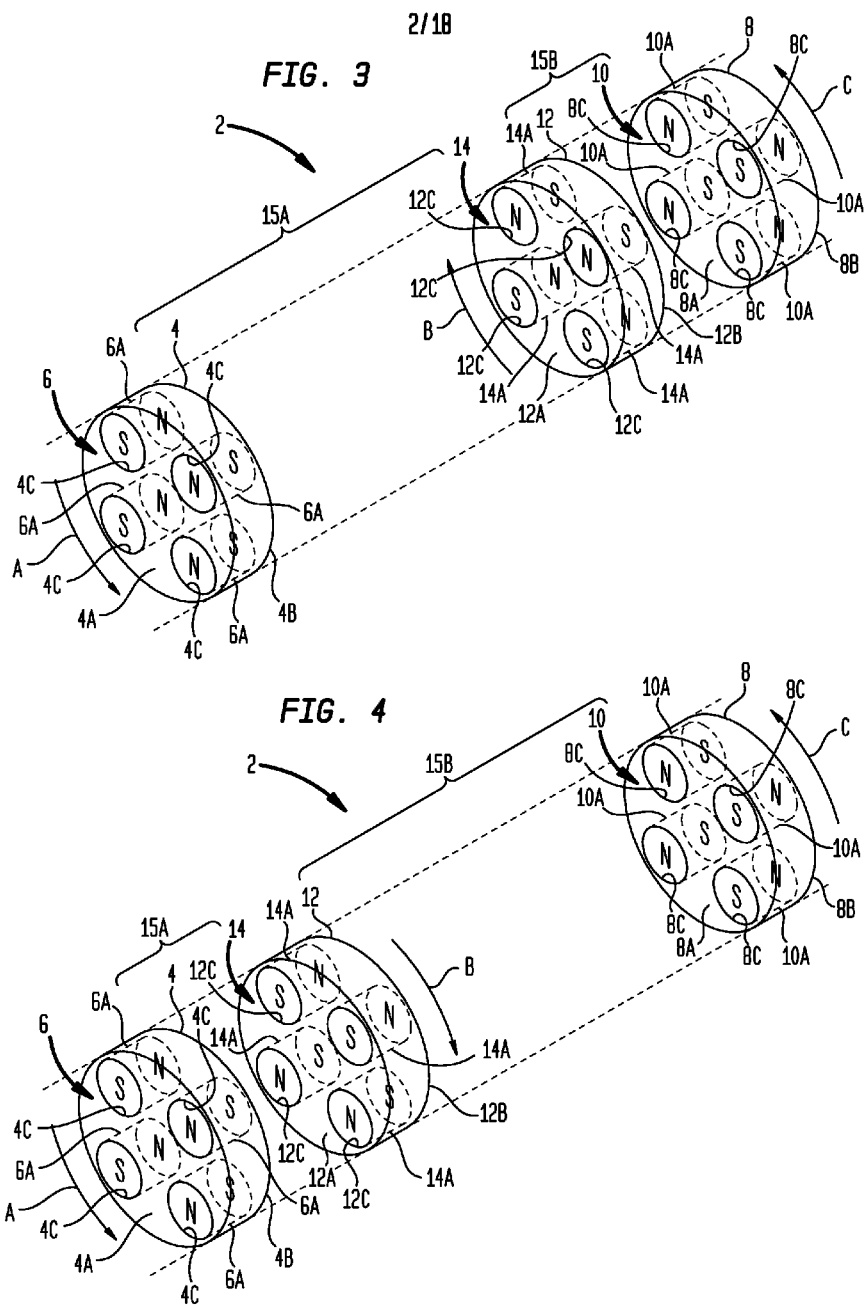

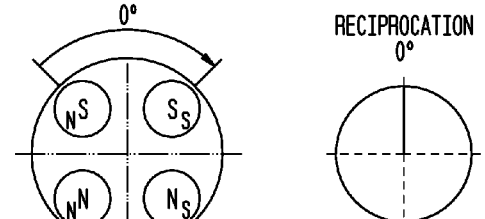
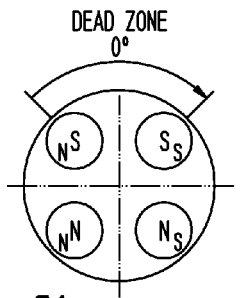 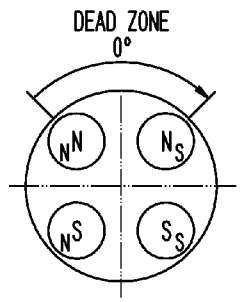
FIG. 6A
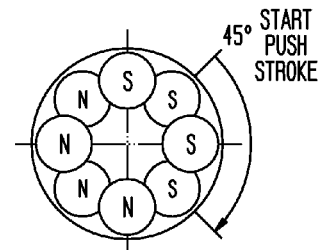 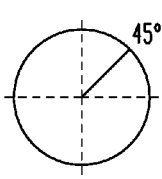 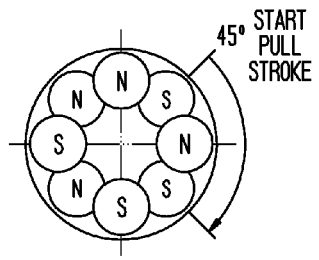
FIG. 6B
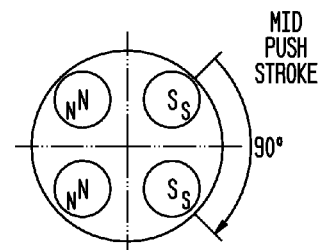 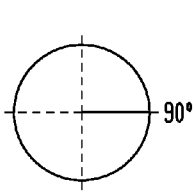 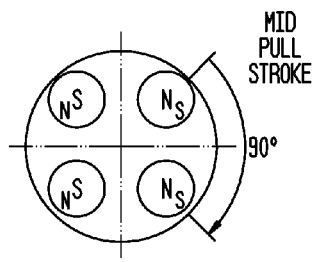
FIG. 6C
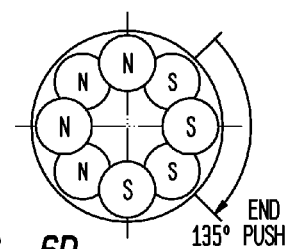 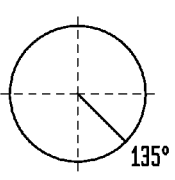 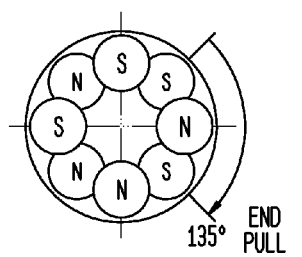
FIG. 6D

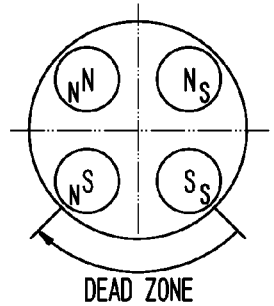
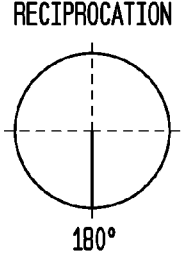
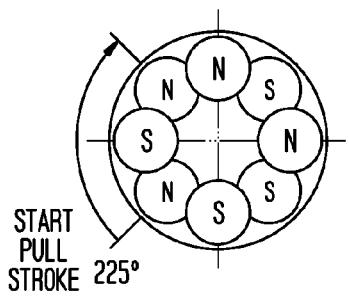
*FIG. 6E*
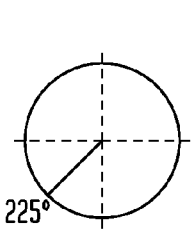
*FIG. 6F*
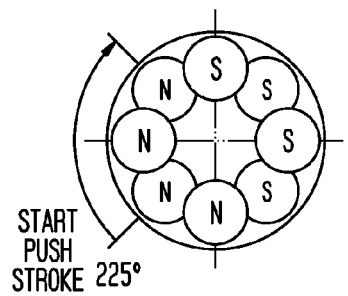
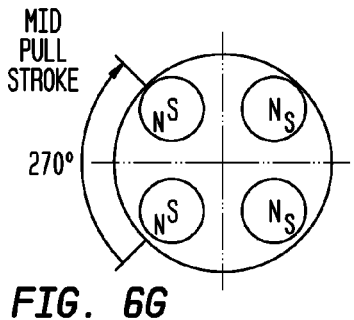
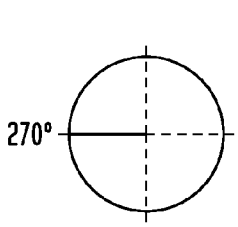
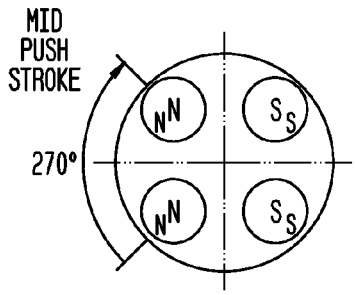
*FIG. 6G*
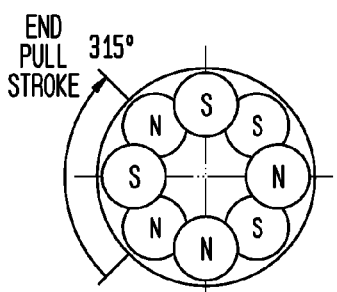
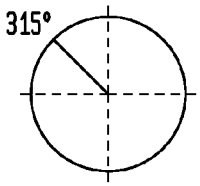
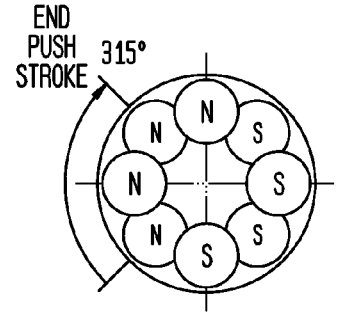
*FIG. 6H*

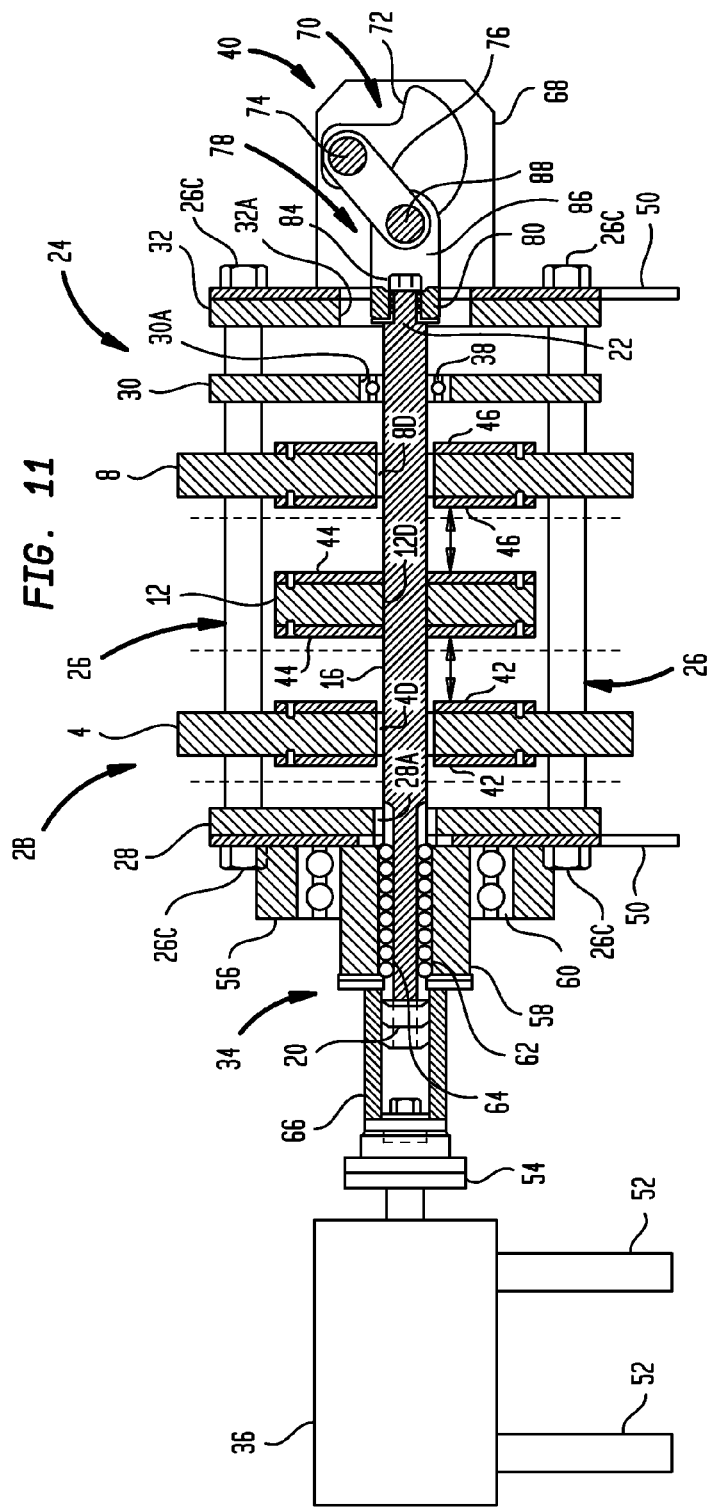

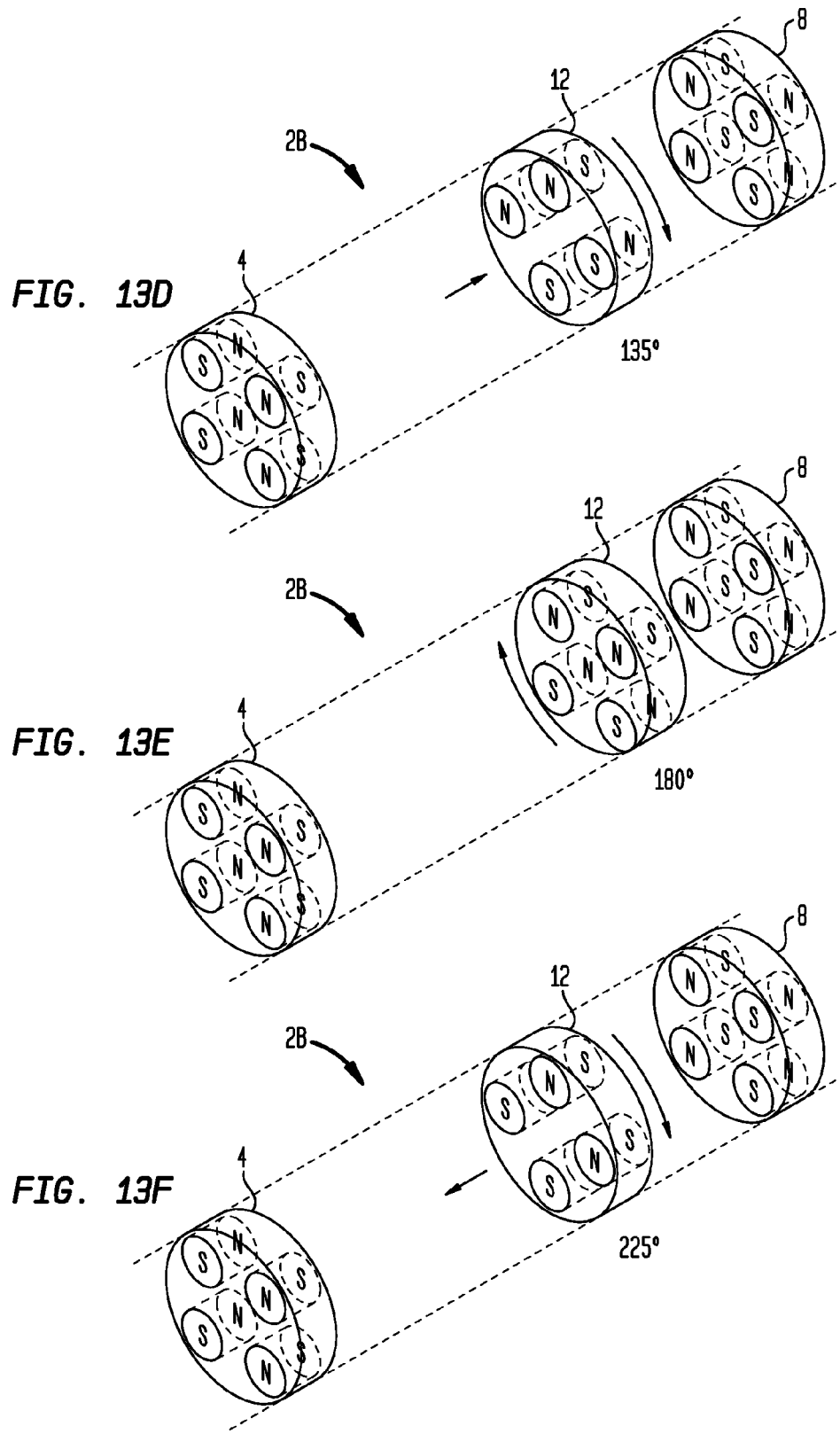

US 8,487,484 B1

PERMANENT MAGNET DRIVE APPARATUS AND OPERATIONAL METHOD

BACKGROUND

1. Field of the Invention

The present invention relates to mechanical drives that convert input forces or torques (applied at a drive input) to output forces or torques (delivered at a drive output). More particularly, the invention concerns reciprocating drive systems that perform force or torque conversion by way of magnetic field interactions between permanent magnets.

2. Description of the Prior Art

By way of background, there are numerous patents, published patent applications and other literature proposing the use of permanent magnets to actuate reciprocating drive devices, such as motion converters, power transmitters, motors and other apparatus. In many cases, the proposed devices reflect conceptions that have likely never been built, and which would be unlikely to produce practical benefits if they ever were constructed. This is not to say that such disclosures are inoperative. Indeed, many permanent magnet drive systems have been constructed, and one need only consult the popular You Tube® website to see various videos depicting such devices.

Yet no one, it seems, has approached permanent magnet drive construction from the standpoint of an engine designer having in mind basic principles of reciprocating engine operation. An apparently unrecognized requirement is the need to periodically relax the drive components in order to facilitate continuous reciprocating movement. As far as known, this problem has not been addressed to date and may be one reason why permanent magnet reciprocating drives have largely remained the domain of hobbyists and tinkerers.

SUMMARY

An advance in the art is provided by a magnetic drive apparatus having a novel magnet arrangement that is particularly suited for reciprocating operation. In an embodiment, the magnetic drive apparatus includes first and second magnet carriers carrying first and second permanent magnet arrangements. An intermediate magnet carrier is disposed between the first and second magnet carriers, and carries a third permanent magnet arrangement. The intermediate magnet carrier and the first and second magnet carriers are arranged for rotation relative to each other (relative rotation). During such relative rotation, the magnet arrangements produce magnetic interactions that result in power stroke forces. The power stroke forces cause the intermediate magnet carrier and the first and second magnet carriers to undergo reciprocation relative to each other (relative reciprocation) in first and second stroke directions during power zone portions of the relative rotation. The magnetic interactions impart substantially no power stroke forces during dead zone portions of the relative rotation. The dead zones encompass relative rotational positions of the magnet carriers wherein opposing magnetic poles of the first, second and third permanent magnet arrangements are mutually coaxially aligned but produce a substantially equal balance of push and pull magnetic forces. The relative rotation and the relative reciprocation between the intermediate magnet carrier and the first and second magnet carriers can be synchronized so that the dead zones occur proximate to top dead center and bottom dead center relative reciprocation positions of the magnet carriers (which is where relaxation of power stroke forces is desired), and so that the power stroke forces occur between the top dead center and bottom dead center relative reciprocation positions (which is where maximum magnetic force is desired).

In an embodiment of the magnetic drive apparatus, a transition zone exists at each transition between one of the dead zones and one of the power zones. Each transition zone represents a transition period between the magnet carriers experiencing substantially no power stroke forces and substantially maximum power stroke forces.

In an embodiment of the magnetic drive apparatus, the first permanent magnet arrangement, the second permanent magnet arrangement and the third permanent magnet arrangement each comprise a set of magnets arranged in a magnet pattern. The magnets are oriented on their respective magnet carriers to present a first magnetic pole on a first magnet carrier side and a second magnetic pole on a second magnet carrier side. Each magnet pattern may have an even number of magnets. On any given magnet carrier side, there may be an equal number of N and S poles arranged in at least a first n-magnet grouping having n adjacent magnetic poles of a first polarity and at least a second n-magnet grouping having n adjacent magnetic poles of a second polarity, with "n" being an even number.

In an embodiment of the magnetic drive apparatus, the first magnet carrier has an interior side that faces a first side of the intermediate magnet carrier to form a first magnetic interaction zone, and the second magnet carrier has an interior side that faces a second side of the intermediate magnet carrier to form a second magnetic interaction zone. In this configuration, the power stroke forces will be imparted when all opposing magnetic poles in the first and second magnetic interaction zones are coaxially aligned in the power zone portions of relative magnet carrier rotation to either mutually repel or attract each other. In particular, the power stroke forces will produce relative reciprocation in a first direction when opposing magnetic poles in the first magnetic interaction zone are all coaxially aligned to mutually repel each other while opposing magnetic poles in the second magnetic interaction zone are all coaxially aligned to mutually attract each other. Conversely, the power stroke forces will produce relative reciprocation in a second direction when opposing magnetic poles in the first magnetic interaction zone are all coaxially aligned to mutually attract each other while opposing magnetic poles in the second magnetic interaction zone are all coaxially aligned to mutually repel each other. The power zones may also extend for some rotational distance on either side of the coaxial alignment positions.

In an embodiment of the magnetic drive apparatus, each dead zone includes a relative rotation position of the magnet carriers wherein one half of the opposing magnetic poles in the first and second magnetic interaction zones are coaxially aligned to mutually repel each other and the other half of the opposing magnetic poles in the first and second magnetic interaction zones are coaxially aligned to mutually attract each other. The dead zones may also extend for some rotational distance on either side of the coaxial alignment positions.

In an embodiment of the magnetic drive apparatus, a main shaft may extend through each of the magnet carriers. The main shaft may have a central longitudinal axis and may be rotatable about, and capable of reciprocation along, the longitudinal axis. A first end portion of the main shaft may be adapted for operative coupling to an input component that rotates the main shaft. A second end portion of the main shaft may be adapted for operative coupling to an output component that is driven by reciprocation of the main shaft. The main shaft may be rotatably coupled to either the intermediate magnet carrier or the first and second magnet carriers, such that rotation of the main shaft about its longitudinal axis produces the relative rotation between the intermediate magnet carrier and the first and second magnet carriers. The main shaft may be axially coupled to either the intermediate magnet carrier or the first and second magnet carriers, such that reciprocation of the main shaft along its longitudinal axis produces the relative reciprocation between the intermediate magnet carrier and the first and second magnet carriers in the first and second stroke directions. For example, the intermediate magnet carrier may be fixed to a main shaft for both reciprocation and rotation therewith, and the first and second magnet carriers may not be operatively connected to the main shaft at all.

In an embodiment of the magnetic drive apparatus, the first and second magnet carriers may be arranged for adjustable positioning toward and away from the intermediate magnet carrier in order to adjust the strength of the magnetic interactions. The first and second magnet carriers may be adjustably positioned toward and away from the intermediate magnet carrier by a power-driven magnet carrier positioning system.

In another aspect of the disclosed subject matter, a magnetic drive torque converter apparatus is provided by combining a magnetic drive apparatus as disclosed herein with an input component and an output component. The input component may be operatively coupled to either the intermediate magnet carrier or the first and second magnet carriers to produce the relative rotation between the intermediate magnet carrier and the first and second magnet carriers. The output component may be operatively coupled to either the intermediate magnet carrier or the first and second magnet carriers such that the relative reciprocation between the intermediate magnet carrier and the first and second magnet carriers in the first and second stroke directions actuates the output component.

In an embodiment of the magnetic driver torque converter apparatus, the magnetic drive apparatus may include a main shaft that extends through each of the magnet carriers. The main shaft may be as previously described, having a central longitudinal axis and being rotatable about, and capable of reciprocation along, the longitudinal axis. A first end portion of the main shaft is operatively coupled to the input component, which rotates the main shaft. A second end portion of the main shaft is operatively coupled to the output component, which is driven by reciprocation of the main shaft. As mentioned above, the main shaft may be rotatably coupled to either the intermediate magnet carrier or the first and second magnet carriers, such that rotation of the main shaft about its longitudinal axis produces the relative rotation between the intermediate magnet carrier and the first and second magnet carriers. Likewise, the main shaft may be axially coupled to either the intermediate magnet carrier or the first and second magnet carriers, such that reciprocation of the main shaft along its longitudinal axis produces the relative reciprocation between the intermediate magnet carrier and the first and second magnet carriers in the first and second stroke directions.

In an embodiment of the magnetic drive torque converter apparatus, a synchronization device is operatively coupled to synchronize the main shaft with respect to its rotational and reciprocation positions so that the dead zones coincide with the main shaft being proximate to the top dead center and bottom dead center reciprocation positions. For example, the main shaft may be synchronized so that the dead zones are centered on the top dead center and bottom dead center reciprocation positions. Alternatively, the main shaft may be synchronized so that the dead zones are dynamically adjusted in position or size.

In an embodiment of the magnetic drive torque converter apparatus, the synchronization device may be provided by the input component, the output component, and a sensor/feedback system for controlling the input component based on positioning of the output component.

In an embodiment of the magnetic drive torque converter apparatus, the input component may include a rotary drive motor and the output component may include a crankshaft connected to the main shaft by a connecting rod. In that case, the sensor/feedback system may include a sensor arranged to sense rotation of the crankshaft and a controller operable to control the rotary drive motor in response to a crankshaft position signal from the sensor.

In another aspect of the disclosed subject matter, a magnetic drive apparatus is embodied as a two-magnet carrier apparatus instead of a three-magnet carrier apparatus. The two-magnet carrier apparatus includes opposing first and second magnet carriers instead of the first, second and intermediate magnet carriers provided in the three-magnet carrier apparatus. The two opposing magnet carriers respectively carry opposing magnet arrangements that are configured to produce magnetic interactions when the opposing magnet carriers undergo relative rotation. The magnetic interactions produce power stroke forces that cause the opposing magnet carriers to undergo relative reciprocation in first and second stroke directions during power zone portions of the relative rotation. The magnetic interactions produce substantially no power stroke forces during dead zone portions of the relative rotation. The dead zones comprise relative rotational positions of the magnet carriers wherein opposing magnetic poles of the opposing magnet arrangements are mutually coaxially aligned but produce a substantially equal balance of push and pull magnetic forces. The relative rotation and relative reciprocation between the magnet carriers are synchronizable so that the dead zones occur proximate to top dead center and bottom dead center relative reciprocation positions of the magnet carriers, and so that the power zones occur between the top dead center and bottom dead center relative reciprocation positions.

In another aspect of the disclosed subject matter, a set of plural magnetic drive apparatus may be powered by one or more input components to drive a single output component. Each set of plural magnetic drive apparatus may include two or more three-magnet carrier drive apparatus, two or more two-magnet carrier drive apparatus, or any desired combination of one or more three-magnet carrier apparatus and one or more two-magnet carrier apparatus.

In another aspect of the disclosed subject matter, a magnetic drive method is provided. In an example embodiment of the method, opposing magnet carriers are provided that respectively carry opposing magnet arrangements. Relative rotation is induced between the opposing magnet carriers to produce magnetic interactions. The magnetic interactions produce power stroke forces that cause the opposing magnet carriers to undergo relative reciprocation in first and second stroke directions during power zone portions of the relative rotation. The magnetic interactions produce substantially no power stroke forces during dead zone portions of the relative rotation. The dead zones encompass relative rotational positions of the magnet carriers wherein opposing magnetic poles of the opposing magnet arrangements are mutually coaxially aligned but produce a substantially equal balance of push and pull magnetic forces. The relative rotation and the relative reciprocation of the magnet carriers may be synchronized to achieve a desired effect. For example, the synchronizing may include timing the relative rotation and relative reciprocation of the magnet carriers so that the dead zones are centered on top dead center and bottom dead center relative reciprocation positions, and so that the power zones occur between the top dead center and bottom dead center relative reciprocation positions. Alternatively, the synchronizing may include timing the relative rotation and relative reciprocation of the magnet carriers so that the dead zones are dynamically adjusted in position or size.

In another aspect of the disclosed subject matter, a magnetic drive apparatus has opposing magnet carriers respectively carrying opposing magnet arrangements. The opposing magnet arrangements have opposing magnetic poles and are configured to produce magnetic interactions when the opposing magnet carriers undergo relative rotation. The magnetic interactions produce power stroke forces that cause the opposing magnet carriers to undergo relative reciprocation in first and second stroke directions during power zone portions of the relative rotation. The relative rotation further includes rotational dead zones wherein the opposing magnetic poles of the opposing magnet arrangements are mutually coaxially aligned to define an equal number of same-polarity and opposite-polarity opposing pole pairs.

BRIEF DESCRIPTION OF THE DRAWINGS

The foregoing and other features and advantages will be apparent from the following more particular description of example embodiments, as illustrated in the accompanying Drawings, in which:

FIG. 1 is a diagrammatic perspective view showing an example three-magnet carrier magnetic drive apparatus in a first operational position;

FIG. 2 is a diagrammatic perspective view showing the magnetic drive apparatus of FIG. 1 in a second operational position;

FIG. 3 is a diagrammatic perspective view showing the magnetic drive apparatus of FIG. 1 in a third operational position;

FIG. 4 is a diagrammatic perspective view showing the magnetic drive apparatus of FIG. 1 in a fourth operational position;

FIGS. 6A-6H are further timing diagrams showing an example timing of the magnetic drive apparatus of FIG. 1;

FIG. 11 is a partial side view/partial cross-sectional view of the example magnetic drive apparatus construction of FIG. 8, with the cross-section being taken along line 11-11 in FIG. 9;

FIGS. 12A and 12B are enlarged perspective views showing an output coupling component of the example magnetic drive apparatus construction of FIG. 8;

FIGS. 13A-13H are perspective views showing the first, second and intermediate magnet carriers of the example magnetic drive apparatus construction of FIG. 8, with the first and second magnetic carriers being fixed against rotation and reciprocation, and the intermediate magnet carrier being shown in various rotational and reciprocation positions;

DETAILED DESCRIPTION OF EXAMPLE EMBODIMENT

Figure 5:
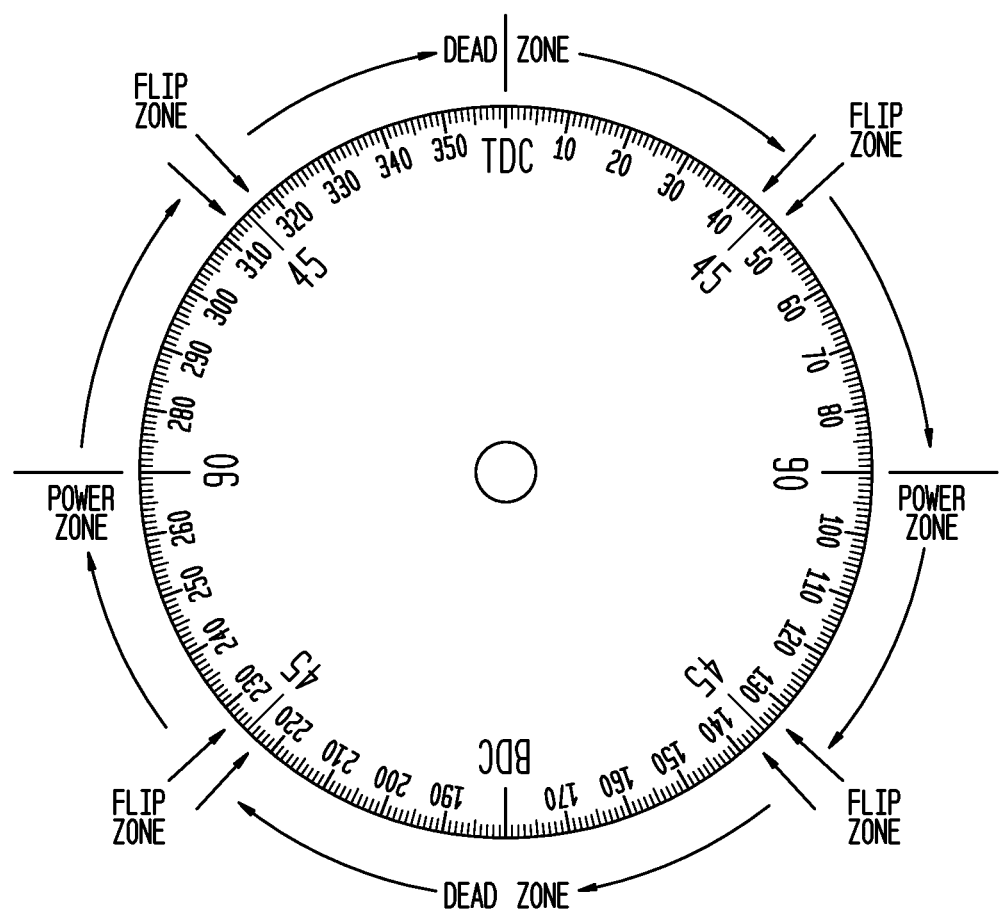
FIG. 5 is a timing diagram showing an example timing of the magnetic drive apparatus of FIG. 1.

Turning now to the drawing figures, which are not necessarily to scale, like reference numerals will be used to represent like elements in all of the several views. As will be described below in connection with various alternative embodiments, a magnetic drive apparatus as disclosed herein may be used to convert a rotary input received from an input power source to a reciprocating output that may be used to drive a load. The rotary input may be continuous or intermittent, uni-directional or bi-directional. The reciprocating output may comprise a repeating cycle of reciprocal strokes. The magnetic drive apparatus uses permanent magnet arrangements that are each configured in a selected magnet pattern to create magnetic interactions as the magnet arrangements are rotated relative to each other by the input power source. These magnetic interactions deliver reciprocating power in each reciprocal stroke direction (power strokes). Advantageously, the magnetic interactions also produce well-defined dead zones of substantially no net magnetic force that can be made to occur proximate to the end of each reciprocal stroke. During each dead zone, the net magnetic forces delivered by the permanent magnet arrangements essentially "switch off." This allows the power stroke forces to momentarily relax and quiesce between power strokes, thus ensuring smooth continuous reciprocating operation.

Turning now to FIGS. 1-4, diagrammatic views of an example three-magnet carrier magnetic drive apparatus 2 are shown in order to illustrate general principles of operation of the subject matter disclosed herein. In the illustrated embodiment, the left-hand end of the magnetic drive apparatus 2 has a first magnet carrier 4 carrying a first permanent magnet arrangement 6 with a set of permanent magnets 6A. The right-hand end of the magnetic drive apparatus 2 has a second magnet carrier 8 carrying a second permanent magnet arrangement 10 with a set of permanent magnets 10A. An intermediate magnet carrier 12 is disposed between the first and second magnet carriers and carries a third permanent magnet arrangement 14 with a set of permanent magnets 14A.

The magnet carriers 4, 8 and 12 have respective first and second sides 4A/4B, 8A/8B and 12A/12B that define a magnet carrier thickness dimension. Although the magnet carriers 4, 8 and 12 are shown as being disk-shaped, other magnet carrier configurations could also be used (e.g., polygonal, star shaped, etc). The magnet carriers 4, 8 and 12 may be fabricated using any suitable metal or non-metal material of sufficient strength and rigidity to handle the magnetic forces, including but not limited to aluminum, titanium, stainless steel, polymers, fiber-reinforced composites, etc. In the case of metals, it is preferred that the material be substantially nonmagnetic (such as aluminum or titanium) or only mildly magnetic (such as stainless steel). Materials that are more magnetic (such as mild steel) may also be used provided it is understood that these materials may influence the magnetic fields of the magnets 6A, 10A and 14A.

The magnets 6A, 10A and 14A are illustrated as being disk magnets that are axially magnetized so as to have a north magnetic polarity on one magnet face and a south magnetic polarity on the opposite magnet face. Each magnet 6A, 10A and 14A has a central longitudinal axis extending between its north and south poles. This axis represents the principal magnetic field axis of the magnets 6A, 10A and 14A. Any suitable permanent magnet material may be used to fabricate the magnets 6A, 10A and 14A. Preferably, magnets with strong magnetic field properties will be used, such as rare earth magnets comprising neodymium iron boron (NeFeB) or samarium cobalt (SmCo). Although less desirable due to their lower magnetic field strength, other types of magnets could also be used, including alnico magnets comprising aluminium, nickel and cobalt in addition to iron, or ceramic magnets comprising ferrite material. Different magnet shapes may also be used. For example, instead of the magnets 6A, 10A and 14A being disk-shaped, the magnets could be spherical, kidney-shaped, banana-shaped, etc. Also, instead of each of the magnets 6A, 10A and 14A being a single magnet, some or all of the magnets could be implemented as a coaxial stack of two or more magnets with their magnetic poles aligned for mutual attraction.

The magnet carriers 4, 8 and 12 may carry their respective magnets 6A, 10A and 14A in any suitable manner. For example, each magnet carrier 4, 8 and 12 may formed with magnet-carrying cutouts of suitable size and shape. If the magnets are disk-shaped as shown in FIGS. 1-4, the magnet carrier 4 may be formed with four circular cutouts 4C that receive the four magnets 6A. Similarly, the magnet carrier 8 may be formed with four circular cutouts 8C that receive the four magnets 10A, and the magnet carrier 12 may be formed with four circular cutouts 12C that receive the four magnets 14A. If desired, the thickness of the magnets 6A, 10A and 14A from one magnet face to the other may be selected to match the thickness of the magnet carriers 4, 8 and 12. Alternatively, the magnets 6A, 10A and 14A could be thicker or thinner than the thickness dimension of their respective magnet carriers 4, 8 and 12. Any suitable magnet retention technique may be used to retain the magnets 6A, 10A and 14A in position. For example, the embodiment of FIGS. 8-12B (described in more detail below) shows an example technique for securing the magnets 6A, 10A and 14A on the magnet carriers 4, 8 and 12 using magnet retainer plates.

The first permanent magnet arrangement 6, the second permanent magnet arrangement 10, and the third permanent magnet arrangement 14 are configured to produce changing magnetic interactions when a rotary input (not shown in FIGS. 1-4) imparts relative rotation between the intermediate magnet carrier 12 and the first and second magnet carriers 4 and 8. In FIGS. 1-4, the relative rotation between the intermediate magnet carrier 12 and the first and second magnet carriers 4 and 8 is represented by arrows "A," "B," and "C." In FIG. 1, the intermediate magnet carrier 12 and the first and second magnet carriers 4 and 8 are shown in a first relative rotational position. In FIG. 2, the intermediate magnet carrier 12 and the first and second magnet carriers 4 and 8 are shown in a second relative rotational position following 180° of relative rotation between the intermediate magnet carrier 12 and the first and second magnet carriers 4 and 8. FIGS. 3 and 4 show relative rotational positions that are midway between the relative rotational positions of FIGS. 1 and 2.

There are various ways that the magnetic drive apparatus 2 may be constructed to facilitate relative rotation between the intermediate magnet carrier 12 and the first and second magnet carriers 4 and 8. For example, the intermediate magnet carrier 12 could be operatively coupled to an input component and rotated by itself while the first and second magnet carriers 4 and 8 remain fixed against rotation. Conversely, the first and second magnet carriers 4 and 8 could be operatively coupled to an input component and rotated together while the intermediate magnet carrier 12 remains fixed against rotation. The first and second magnet carriers 4 and 8 could either rotate in the same direction or in opposite directions. A further alternative would be to rotate the intermediate magnet carrier 12 in one direction while rotating the first and second magnet carriers 4 and 8 in the opposite direction. An example of the first approach is described in more detail below in connection with the constructions shown in FIG. 7 and in FIGS. 8-12B. In these constructions, the intermediate magnet carrier 12 is mounted to a main shaft that is free to rotate independently of the first and second magnet carriers 4 and 8. The first and second magnet carriers 4 and 8 are fixed against rotation by a support frame assembly.

There are also various ways that the magnetic drive apparatus 2 may be constructed to facilitate relative reciprocation between the intermediate magnet carrier 12 and the first and second magnet carriers 4 and 8. For example, the intermediate magnet carrier 12 could be operatively coupled to an output component to actuate reciprocation therein while the first and second magnet carriers 4 and 8 remain fixed against reciprocation. Conversely, the first and second magnet carriers 4 and 8 could both be operatively coupled to an output component to actuate reciprocation therein while the intermediate magnet carrier 12 remains fixed against reciprocation. An example of the first approach is described in more detail below in connection with the constructions shown in FIG. 7 and in FIGS. 8-12B. In these constructions, the intermediate magnet carrier 12 is mounted to a main shaft that is free to reciprocate independently of the first and second magnet carriers 4 and 8. The first and second magnet carriers 4 and 8 are fixed against reciprocation by a support frame assembly.

It should be noted that any magnet carrier that is adapted to reciprocate in order to produce relative reciprocation between the intermediate magnet carrier 12 and the first and second magnet carriers 4 and 8 may also be adapted to rotate in order to produce relative rotation between the intermediate magnet carrier and the first and second magnet carriers. Similarly, any magnet carrier that is fixed against reciprocation may also be fixed against rotation. For example, as described in more detail below in connection with the constructions shown in FIG. 7 and in FIGS. 8-12B, the intermediate magnet carrier 12 may be adapted to both rotate and reciprocate while the first and second magnet carriers 4 and 8 remain fixed against rotation and reciprocation. Conversely, the first and second magnet carriers 4 and 8 could be adapted to both rotate and reciprocate while the intermediate magnet carrier 12 remains fixed against rotation and reciprocation. As a further alternative, any magnet carrier that is adapted to reciprocate may be fixed against rotation, and visa versa. For example, the intermediate magnet carrier 12 could be adapted to reciprocate but not rotate while the first and second magnet carriers 4 and 8 are adapted to rotate but not reciprocate. Conversely, the first and second magnet carriers 4 and 8 could be adapted to reciprocate but not rotate while the intermediate magnet carrier 12 is adapted to rotate but not reciprocate.

In the embodiment of FIGS. 1-4, the number of magnets 6A, 10A and 14A in each respective permanent magnet arrangement 6, 10 and 14 is four. The magnets 6A, 10A and 14A are spaced equally from each other and are symmetrically arranged about the centers of their respective magnet carriers 4, 8 and 12 in a four-sided polygonal pattern (corresponding to the number of magnets) that is square and balanced. Each magnet pattern on any given magnet carrier side 4A/4B, 8A/8B or 12A/12B includes a first pair of adjacent magnetic poles of a first polarity (e.g., N-polarity) and a second pair of adjacent magnetic poles of a second polarity (e.g., S-polarity). In the square four-magnet patterns shown in FIGS. 1-4, a first two opposing sides of each magnet pattern have magnetic poles of the first polarity and a second two opposing sides of the magnet pattern have magnetic poles of the second polarity. Magnetic poles that are diagonal from each other in each square magnet pattern are of opposite polarity. As discussed in more detail below, magnet arrangements with more than four magnets may also be constructed.

In each of FIGS. 1-4, the second side 4B of the first magnet carrier 4 faces the first side 12A of the intermediate magnet carrier 12 to form a first magnetic interaction zone 15A. The first side 8A of the second magnet carrier 8 faces the second side 12B of the intermediate magnet carrier 12 to form a second magnetic interaction zone 15B. With this magnet configuration, the changing magnetic interactions produced by magnet carrier relative rotation impart power stroke forces to the magnet carriers 4, 8 and 12 that produce the above-mentioned reciprocating output. In particular, power stroke forces will be imparted when all opposing magnetic poles in each of the first and second magnetic interaction zones 15A and 15B are aligned to either mutually repel or attract each other.

The power stroke forces produce relative reciprocation between the magnet carriers 4, 8 and 12 in a first direction when opposing magnetic poles in the first magnetic interaction zone 15A all mutually repel each other while opposing magnetic poles in the second magnetic interaction zone 15B all mutually attract each other. Conversely, the power stroke forces produce relative reciprocation between the magnet carriers 4, 8 and 12 in a second direction when opposing magnetic poles in the first magnetic interaction zone 15A all mutually attract each other while opposing magnetic poles in the second magnetic interaction zone 15B all mutually repel each other.

The magnet carriers 4, 8 and 12 may be said to be in "power zone" portions of their relative rotation when the magnetic interactions produce the above-described power stroke forces. There is one power zone for each power stroke direction. Power zone positions of the magnetic drive apparatus 2 are exemplified by FIGS. 1 and 2. FIG. 1 illustrates the magnetic drive apparatus 2 at the center of a first power zone in which the magnetic interactions produce power stroke forces in a first direction. The intermediate magnet carrier 12 and the first magnet carrier 4 are pushed apart due to each magnetic pole on side 12A of the intermediate magnet carrier being mutually coaxially aligned with an opposing magnetic pole of like polarity on side 4B of the first magnet carrier. This pushing force is represented by the arrows "D." As can be seen, the magnet carriers 4 and 12 are rotatably positioned such that there are two N-N interactions and two S-S interactions in the magnetic interaction zone 15A. At the same time, the intermediate magnet carrier 12 and the second magnet carrier 8 are pulled together due to each magnetic pole on side 12B of the intermediate magnet carrier being mutually coaxially aligned with an opposing magnetic pole of opposite polarity on side 8A of the second magnet carrier. This pull force is represented by the arrows "E." As can be seen, the magnet carriers 8 and 12 are rotatably positioned such that there are two N-S interactions and two S-N interactions in the magnetic interaction zone 15B.

FIG. 2 illustrates the magnetic drive apparatus 2 at the center of a second power zone in which the magnetic interactions produce power stroke forces in a second direction. As noted above, this state follows 180° of relative rotation (from the position shown in FIG. 1) between the intermediate magnet carrier 12 and the first and second magnet carriers 4 and 8. The intermediate magnet carrier 12 and the first magnet carrier 4 are pulled together due to each magnetic pole on side 12A of the intermediate magnet carrier being mutually coaxially aligned with an opposing magnetic pole of opposite polarity on side 4B of the first magnet carrier. This pull force is represented by the arrows "E." As can be seen, the magnet carriers 4 and 12 are rotatably positioned such that there are two N-S interactions and two S-N interactions in the magnetic interaction zone 15A. At the same time, the intermediate magnet carrier 12 and the second magnet carrier 8 are pushed apart due to each magnetic pole on side 12B of the intermediate magnet carrier being mutually coaxially aligned with an opposing magnetic pole of like polarity on side 8A of the second magnet carrier. This pushing force is represented by the arrows "D." As can be seen, the magnet carriers 8 and 12 are rotatably positioned such that there are two N-N interactions and two S-S interactions in the magnetic interaction zone 15B.

It should be noted that the power zones extend beyond the coaxial alignment positions of the magnetic poles shown in FIGS. 1 and 2, such that each power zone has a rotational range or "width" that spans a portion of one revolution of magnet carrier relative rotation. Each power zone will thus start prior to the opposing magnetic poles of the magnet arrangements 6, 10 and 14 being rotated into mutual coaxial alignment and will end subsequent to the mutual coaxial alignment position. Power stroke forces will be generated at any given relative rotation position of the magnet carriers 4, 8 and 12 within each power zone.

The magnet arrangements 6, 10 and 14 may be said to be in "dead zone" portions of their relative rotation when there are substantially no power stroke forces acting on the magnet carriers 4, 8 and 12. In the four-magnet arrangements 6, 10 and 14 of FIGS. 1-4, there is one well-defined dead zone centered between each well-defined power zone, and each relative reciprocation cycle comprises two power zones separated by two dead zones. The dead zones exist when opposing magnetic poles of the first magnet carrier 4, the second magnet carrier 8 and the intermediate magnet carrier 12 are mutually coaxially aligned but produce a substantially equal balance of push and pull magnetic forces. In the dead zones, one half of the opposing magnetic poles in the first and second magnetic interaction zones 15A and 15B are aligned to mutually repel each other and the other half of the opposing magnetic poles in the first and second magnetic interaction zones are aligned to mutually attract each other. The dead zones are effected when the relative rotation between the intermediate magnet carrier 12 and the first and second magnet carriers 4 and 8 is half way between the rotational positions that produce the power strokes within each power zone. The dead zones are centered at the relative rotational positions shown in FIGS. 3 and 4.

The center of the dead zone shown in FIG. 3 corresponds to 90° of magnet carrier relative rotation from the power zone rotational position of FIG. 1. The center of the dead zone shown in FIG. 4 corresponds to 90° of magnet carrier relative rotation from the power zone rotational position of FIG. 2. In both of these dead zone positions, the opposing magnetic poles in each magnetic interaction zone 15A and 15B are mutually coaxially aligned, but their polarities are such as to create net magnetic forces of substantially zero as a result of two of the opposing magnetic poles being of the same polarity and the other two opposing magnetic poles being of opposite polarity. In particular, in each of FIGS. 3 and 4, the magnet carriers 4, 8 and 12 are rotatably positioned such that there is one N-N interaction, one S-S interaction, one N-S interaction and one S-N interaction in each magnetic interaction zone 15A and 15B. Like the power zones, the dead zones extend beyond the coaxial alignment positions of the magnetic poles, such that each dead zone has a rotational range or "width" that spans a portion of one revolution of relative magnet carrier rotation. Each dead zone will thus start prior to the opposing magnetic poles of the magnet arrangements 6, 10 and 14 being rotated into coaxial alignment, and will end subsequent to the coaxial alignment position.

In a prototype implementation of the magnetic drive apparatus 2, which was constructed in accordance with FIGS. 8-12B (discussed in more detail below), the four magnets 6A, 10A and 14A on each respective magnet carrier 4, 8 and 12 were implemented with 3 inch diameter, 1 inch thick, grade N52 neodymium disk magnets from K & J Magnetics, Inc. Each magnet 6A, 10A and 14A was axially magnetized and was rated by the manufacturer as producing a maximum push/pull force of approximately 360 pounds. The magnets 6A, 10A and 14A were arranged on their respective magnet carriers 4, 8 and 12 so that the magnet centers were 2.75 inches from the magnet carrier centers. The stroke length of the magnet carrier relative reciprocation was 5.5 inches. At the end of each stroke, the separation between the closest together magnet carriers resulted in a minimum spacing between opposing magnets (pole face to pole face) of 1.125 inches. At midstroke, the separation between the magnet carriers was equal, and resulted a maximum spacing between opposing magnets (pole face to pole face) of 3.875 inches. In tests conducted on this prototype, the power zones and the dead zones each spanned approximately 90° of magnet carrier relative rotation at all relative reciprocation positions. Similar results would be expected for other magnetic drive apparatus implementations wherein the magnet arrangements each have four magnets arranged in a balanced square magnet pattern.

The relative rotation and relative reciprocation between the intermediate magnet carrier 12 and the first and second magnet carriers 4 and 8 can be synchronized so that the dead zones and the power zones occur at selected portions of magnet carrier relative reciprocation. FIG. 1 shows a power zone that is centered proximate to the midpoint of a first power stroke in a first direction. FIG. 2 shows another power zone that is centered proximate to the midpoint of a second power stroke in the opposite direction. FIG. 3 shows a dead zone that is centered between the end of the power stroke of FIG. 1 and the beginning of the power stroke of FIG. 2. This may be referred to as the bottom dead center relative reciprocation position of the magnet carriers 4, 8 and 12. FIG. 4 shows another dead zone that is centered between the end of the power stroke of FIG. 2 and the beginning of the power stroke of FIG. 1. This may be referred to as the top dead center relative rotation position of the magnet carriers 4, 8 and 12.

FIG. 5 shows a timing disk that represents another way to view the synchronization shown in FIGS. 1-4. In this illustration, both the magnet carrier relative rotation and the magnet carrier relative reciprocation are expressed in angular terms. The synchronization is such that for every degree of relative magnet carrier rotation, there is one degree of relative magnet carrier reciprocation. The dead zones are centered at the 0° top dead center and 180° bottom dead center relative reciprocation positions, and the power zones are centered between the dead zones. It will be appreciated that expressing the magnet carrier relative reciprocation in angular terms is permissible because the relative reciprocation represents periodic motion. Using an angular expression of the relative reciprocation is more convenient than using the actual magnet carrier relative displacement because the latter is implementation-specific. For example, if the relative reciprocation of the magnet carriers 4, 8 and 12 represents simple harmonic motion, the standard equation: $d = A \cos(\theta)$ gives the magnet carrier relative displacement "d." In this equation, the angle $\theta$ is the magnet carrier relative reciprocation in angular terms, and the value "A" is the maximum magnet carrier relative displacement from the midstroke position that occurs at $\theta=0°$ and $\theta=180°$. Other equations govern different types of periodic motion. For example, if the relative reciprocation of the magnet carriers 4, 8 and 12 behaves like a piston coupled to a crankshaft via a connecting rod (as it does in the embodiment of FIGS. 8-12B below), the magnet carrier relative displacement will be given by the standard equation $d = r\cos(\theta) + (l^2 - r^2 \sin(\theta)^2)^{1/2}$. In this equation, the angle $\theta$ is the magnet carrier relative reciprocation in angular terms, the value "d" is the magnet carrier relative displacement with respect to the crankshaft axis, "r" is the crank arm length, and "l" is the connecting rod length.

As stated, FIG. 5 shows a synchronization scheme in which, for every degree of relative magnet carrier rotation, there is one degree of relative magnet carrier reciprocation. At the 0° position marked "TDC," the magnet carriers 4, 8 and 12 are in the top dead center relative reciprocation position and are rotationally positioned at the center of a first dead zone. At approximately 45° of relative rotation/reciprocation of the magnet carriers 4, 8 and 12, the end of the first dead zone is reached and the magnet carriers transition into a first power zone that produces power stroke forces in a first direction. The center of this power zone is at approximately the 90° relative rotation/reciprocation position. At approximately 135° of relative rotation/reciprocation of the magnet carriers 4, 8 and 12, the end of the first power zone is reached and the magnet carriers transition into a second dead zone. At the 180° position marked "BDC," the magnet carriers 4, 8 and 12 are in the bottom dead center relative reciprocation position and are rotationally positioned at the center of the second dead zone. At approximately 225° of relative rotation/reciprocation of the magnet carriers 4, 8 and 12, the end of the second dead zone is reached and the magnet carriers transition into a second power zone that produces power stroke forces in a second direction. The center of this power zone is at approximately the 270° relative rotation/reciprocation position. At approximately 315° of relative rotation/reciprocation of the magnet carriers 4, 8 and 12, the end of the second power zone is reached and the magnet carriers transition back to the first dead zone. The 0° TDC position is reached again after another 45° of relative rotation/reciprocation of the magnet carriers 4, 8 and 12.

As noted above, the starting and ending positions of the power zones and dead zones are approximate. This is because the transition from power zone to dead zone and from dead zone to power zone does not occur instantaneously. Advantageously, however, these transition zones (designated as "flip" zones in FIG. 5) have been determined to be quite short, and did not exceed approximately 5° of relative rotation/reciprocation in the above-described prototype implementation of the magnetic drive apparatus 2. Each transition zone represents a transition period between the magnet carriers 4, 8 and 12 experiencing substantially no power stroke forces and substantially maximum power stroke forces. It should be noted that characterizing the dead zones as producing "substantially no power stroke forces" does not necessarily mean there are exactly zero net forces within the dead zones. However, no dead zone forces have been observed to exceed more than several pounds, and were orders of magnitude less than the power stroke forces in the prototype implementation of the magnetic drive apparatus 2. Moreover, these very small dead zone forces occur away from the dead zone centers, and have no effect on the reciprocal operation of the magnetic drive apparatus 2.

As described below in connection with the example construction shown in FIGS. 8-12B, the synchronization shown in FIGS. 1-5 may be established and maintained by a feedback system that monitors the relative reciprocation between the magnet carriers 4, 8 and 12 and uses this information to control the relative rotation of the magnet carriers. Alternatively, a mechanical timing system could be provided wherein the relative rotation and relative reciprocation between the magnet carriers 4, 8 and 12 are synchronized using a mechanical coupling arrangement. If desired, the synchronization may be adjusted so that the magnet carrier relative rotation is advanced or retarded with respect to the magnet carrier relative reciprocation. For example, the dead zone relative rotation positions may be shifted so that the dead zones are centered either before or after the TDC and BDC relative reciprocation positions. As in an automotive engine, the magnet carrier relative rotation could be dynamically advanced and retarded to adjust the dead zone positions according to the speed of the magnet carrier relative reciprocation. It would also be possible to dynamically advance and retard the magnet carrier relative rotation with respect to the magnet carrier relative reciprocation at selected times during each revolution of relative rotation. This will have the effect of adjusting the size of the dead zones relative to the power zones. For example, if it is desired to decrease the dead zone width while increasing the power zone width, the magnet carrier relative rotation can be dynamically retarded (slowed down) within the power zones and dynamically advanced (sped up) within the dead zones. Similarly, if it is desired to increase the dead zone width while decreasing the power zone width, the magnet carrier relative rotation can be dynamically advanced (sped up) within the power zones and dynamically retarded (slowed down) within the dead zones.

FIGS. 6A-6H presents additional views of the relative rotation/reciprocation cycle of the magnet carriers 4, 8 and 12 using the synchronization scheme shown in FIGS. 1-5. Each of FIGS. 6A-6H shows a 45° incrementation of the relative rotational and reciprocation positions of the magnet carriers 4, 8 and 12. The center portion of each figure shows the magnet carrier relative reciprocation position (in angular terms). The left hand portion of each figure depicts the relative rotational positions of the first magnet carrier 4 and the intermediate magnet carrier 12. The alignment of the opposing magnets in the first magnetic interaction zone 15A (see FIGS. 1-4) is also shown, as are the polarities of each pair of opposing magnets (i.e., the polarities of the magnets 14A on the first side 12A of the intermediate magnet carrier 12 and the polarities of the magnets 6A on the second side 4B of the first magnet carrier 4). The right hand portion of each figure depicts the relative rotational positions of the second magnet carrier 8 and the intermediate magnet carrier 12. The alignment of the opposing magnets in the second magnetic interaction zone 15B (see FIGS. 1-4) is also shown, as are the polarities of each pair of opposing magnets (i.e., the polarities of the magnets 14A on the second side 12B of the intermediate magnet carrier 12 and the polarities of the magnets 10A on the first side 8A of the second magnet carrier 8).

As an interpretive guide, the left-hand portion of FIGS. 6A-6H is a view looking from the second side 4B of the first magnet carrier 4 toward the first side 12A of the intermediate magnet carrier 12. The right-hand portion of FIGS. 6A-6H is a view looking from the second side 12B of the intermediate magnet carrier 12 toward the first side 8A of the second magnet carrier 8. In the positions where the opposing magnets overlap (i.e., FIGS. 6A, 6C, 6E and 6G), the letter (S or N) at the center of each depicted magnet pair is the polarity of the magnet 14A on the intermediate magnet carrier 12, and the offset letter (S or N) is the polarity of its opposing magnet 6A or 10A on the first or second magnet carrier 4 or 8. In the positions where the opposing magnets do not overlap (i.e., FIGS. 6B, 6D, 6F and 6H), the magnets 14A of the intermediate magnet carrier 12 are depicted as being above the opposing magnets 6A or 10A of the first or second magnet carriers 4 or 8. In a similar vein, when the polarities of opposing magnet pairs are discussed below, the first polarity will be that of a magnet 14A of the intermediate magnet carrier 12 and the second polarity will be that of a magnet 6A of the first magnet carrier 4 or a magnet 10A of the second magnet carrier 8 (depending on whether the first or second magnetic interaction zone 15A or 15B is being discussed). When magnet pair polarities are enumerated below, they will start in the upper left quadrant of each magnet arrangement and continue in clockwise order.

FIG. 6A depicts the magnet carriers 4, 8 and 12 in a 0° relative rotation/reciprocation position. In this position, the magnetic interactions in the first magnetic interaction zone 15A are S-N, S-S, N-S and N-N. The magnetic interactions in the second magnetic interaction zone 15B are N-N, N-S, S-S and S-N. In each magnetic interaction zone 15A and 15B, half of the opposing magnet pairs are coaxially aligned for mutual attraction and the other half are coaxially aligned for mutual repulsion. Thus, FIG. 6A depicts a dead zone that is centered at the 0° TDC relative reciprocation position of the magnet carriers 4, 8 and 12. As can be seen, this dead zone is approximately 90° wide.

FIG. 6B depicts the magnet carriers 4, 8 and 12 in a 45° relative rotation/reciprocation position. In this position, the relative rotation of the magnet carriers 4, 8 and 12 is halfway between the midpoints of dead zone and power zone rotational positions. The magnet carriers 4, 8 and 12 are thus in a transition zone wherein the magnetic forces are changing from the substantially net zero condition of a dead zone to the full magnetic force condition of a power zone.

FIG. 6C depicts the magnet carriers 4, 8 and 12 in a 90° relative rotation/reciprocation position. In this position, the magnetic interactions in the first magnetic interaction zone 15A are N-N, S-S, S-S and N-N. All of the opposing magnet pairs in this magnetic interaction zone are coaxially aligned with like polarities so that the first magnet carrier 4 and the intermediate magnet carrier 12 repel each other with maximum push force. The magnetic interactions in the second magnetic interaction zone 15B are S-N, N-S, N-S and S-N. All of the opposing magnet pairs in this magnetic interaction zone are coaxially aligned with opposite polarities so that the second magnet carrier 8 and the intermediate magnet carrier 12 attract each other with maximum pull force. FIG. 6C therefore depicts a first power zone that is centered at the 90° relative reciprocation position of the magnet carriers 4, 8 and 12. As can be seen, this power zone is approximately 90° wide.

FIG. 6D depicts the magnet carriers 4, 8 and 12 in a 135° relative rotation/reciprocation position. In this position, the relative rotation of the magnet carriers 4, 8 and 12 is halfway between the midpoints of dead zone and power zone rotational positions. The magnet carriers 4, 8 and 12 are thus in a transition zone wherein the magnetic forces are changing from the full magnetic force condition of a power zone to the substantially net zero condition of a dead zone.

FIG. 6E depicts the magnet carriers 4, 8 and 12 in a 180° relative rotation/reciprocation position. In this position, the magnetic interactions in the first magnetic interaction zone 15A are N-N, N-S, S-S and S-N. The magnetic interactions in the second magnetic interaction zone 15B are S-N, S-S, N-S and N-N. In each magnetic interaction zone 15A and 15B, half of the opposing magnet pairs are coaxially aligned for mutual attraction and the other half are coaxially aligned for mutual repulsion. Thus, FIG. 6E depicts a dead zone that is centered at the 180° BDC relative reciprocation position of the magnet carriers 4, 8 and 12. As can be seen, this dead zone is approximately 90° wide.

FIG. 6F depicts the magnet carriers 4, 8 and 12 in a 225° relative rotation/reciprocation position. In this position, the relative rotation of the magnet carriers 4, 8 and 12 is halfway between the midpoints of dead zone and power zone rotational positions. The magnet carriers 4, 8 and 12 are thus in a transition zone wherein the magnetic forces are changing from the substantially net zero condition of a dead zone to the full magnetic force condition of a power zone.

FIG. 6G depicts the magnet carriers 4, 8 and 12 in a 270° relative rotation/reciprocation position. In this position, the magnetic interactions in the first magnetic interaction zone 15A are S-N, N-S, N-S and S-N. All of the opposing magnet pairs in this magnetic interaction zone are coaxially aligned with opposite polarities so that the first magnet carrier 4 and the intermediate magnet carrier 12 attract each other with maximum pull force. The magnetic interactions in the second magnetic interaction zone 15B are N-N, S-S, S-S and N-N. All of the opposing magnet pairs in this magnetic interaction zone are coaxially aligned with like polarities so that the second magnet carrier 8 and the intermediate magnet carrier 12 repel each other with maximum push force. FIG. 6G therefore depicts a power zone that is centered at the 270° relative reciprocation position of the magnet carriers 4, 8 and 12. As can be seen, this power zone is approximately 90° wide.

FIG. 6H depicts the magnet carriers 4, 8 and 12 in a 315° relative rotation/reciprocation position. In this position, the relative rotation of the magnet carriers 4, 8 and 12 is halfway between the midpoints of dead zone and power zone rotational positions. The magnet carriers 4, 8 and 12 are thus in a transition zone wherein the magnetic forces are changing from the full magnetic force condition of a power zone to the substantially net zero condition of a dead zone.

Figure 7:
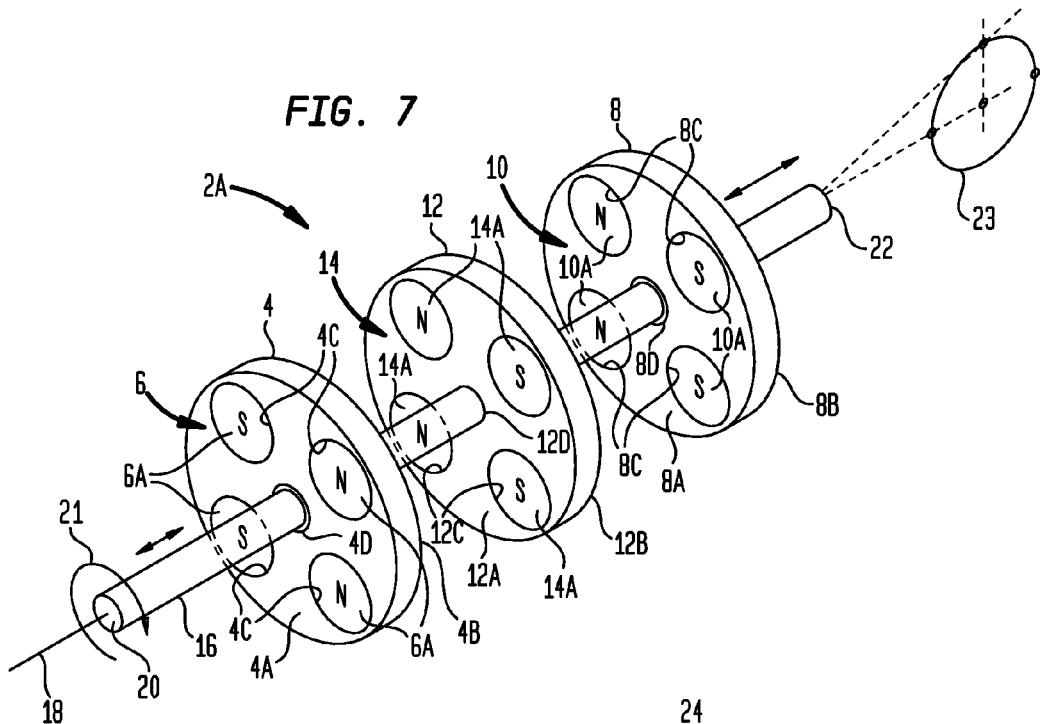
FIG. 7 is a perspective view showing an example construction of the magnetic drive apparatus of FIG. 1 in combination with an input component and an output component to provide a magnetic drive torque converter apparatus.

Turning now to FIG. 7, the magnetic drive apparatus 2 is shown in an example construction 2A wherein the intermediate magnet carrier 12 is adapted for rotation and reciprocation while the first and second magnet carriers 4 and 6 are adapted to remain fixed against rotation and reciprocation. In the magnetic drive apparatus construction 2A, a main shaft 16 is arranged to extend through central bores 4D, 8D and 12D that are respectively formed in the magnet carriers 4, 8 and 12. The main shaft 16 is substantially straight and has a central longitudinal axis 18 that is substantially parallel to the longitudinal axes (and magnetic field axes) of the magnets 6A, 10A and 14A.

The main shaft 16 is arranged for simultaneous rotation and reciprocation. A first end portion 20 of the main shaft 16 is adapted for operative coupling to an input component 21, shown diagrammatically in FIG. 7, that rotatably drives the main shaft. For example, as described in more detail below in connection with FIGS. 8-12B, the input component 21 may be provided by a rotary drive motor. A second end portion 22 of the shaft 16 is adapted for operative coupling to an output component that is driven by reciprocation of the main shaft 18. In FIG. 7, an example rotary output component 23, which may be implemented as a crankshaft, is shown diagrammatically. Alternatively, a reciprocating output component, such as a pneumatic or hydraulic piston, could be arranged to be driven by reciprocation of the main shaft 18. The addition of the input and output components 21 and 23 to the magnetic drive apparatus construction 2A forms a magnetic drive torque converter apparatus that converts an input torque applied by the input component to an output torque delivered by the output component 23.

The main shaft 16 is rotatably coupled to the central opening 12D of the intermediate magnet carrier 12, but is free to rotate within the central openings 4D and 8D of the first and second magnet carriers 4 and 8. The rotatably coupled intermediate magnet carrier 12 rotates with the main shaft 16 but the non-rotatably coupled first and second magnet carriers 4 and 8 will not rotate, and will preferably be fixed against rotation. In this way, rotation of the main shaft 16 about its longitudinal axis 18 by the input component 21 will produce relative rotation between the intermediate magnet carrier 12 and the first and second magnet carriers 4 and 8. The main shaft 16 is also axially coupled to the central opening 12D of the intermediate magnet carrier 12, but is free to reciprocate through the central openings 4D and 8D of the first and second magnet carriers 4 and 8. The axially coupled intermediate magnet carrier 12 reciprocates with the main shaft 16 but the non-axially coupled first and second magnet carriers 4 and 8 will not reciprocate, and will preferably be fixed against reciprocation. In this way, reciprocation of the main shaft 16 along its longitudinal axis 18 will produce relative reciprocation between the intermediate magnet carrier 12 and the first and second magnet carriers 4 and 8 in first and second stroke directions.

Turning now to FIGS. 8-12B, the magnetic drive apparatus 2 is shown in a further example construction 2B that uses the rotating/reciprocating main shaft arrangement described in connection with the example construction 2A of FIG. 7. As in the case of FIG. 7, FIGS. 8-12B depict a magnetic drive torque converter apparatus because the magnetic drive apparatus construction 2B is operatively coupled to input and output components, namely, an input motor 36 and a crankshaft assembly 40 (both of which are described in more detail below). In the magnetic drive apparatus construction 2B, the intermediate magnet carrier 12 is again rotatably and axially coupled to the main shaft 16 while the first and second magnet carriers 4 and 8 are not coupled to the main shaft in any way.

Figure 10A:
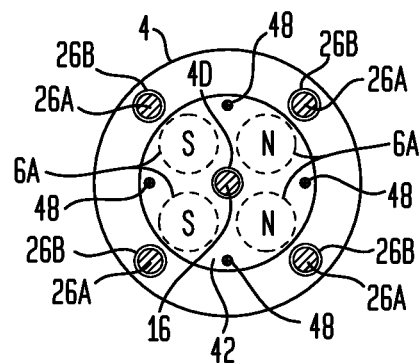
FIG. 10A is a cross-sectional view taken along line 10A-10A in FIG. 9.
Figure 10B:
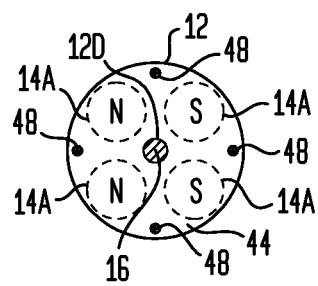
FIG. 10B is a cross-sectional view taken along line 10B-10B in FIG. 9.
Figure 10C:
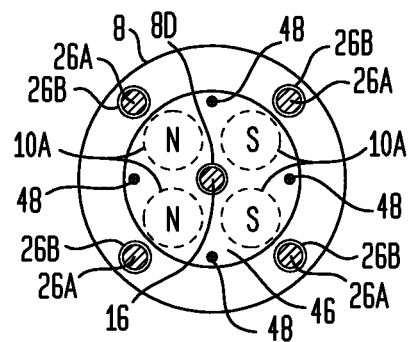
FIG. 10C is a cross-sectional view taken along line 10C-10C in FIG. 9.
Figure 10D:
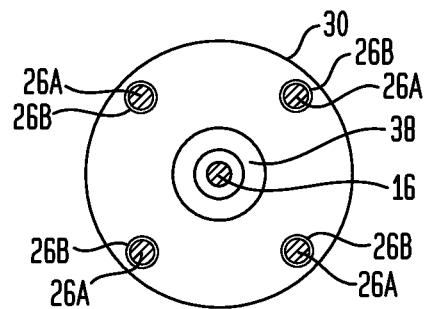
FIG. 10D is a cross-sectional view taken along line 10D-10D in FIG. 9.
Figure 10E:
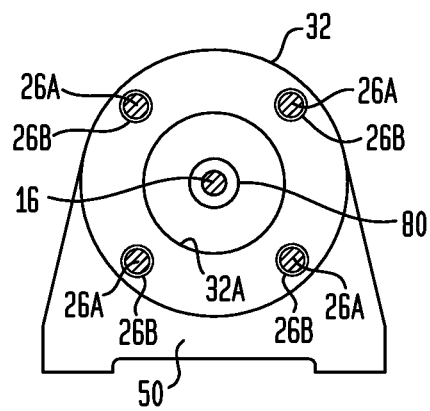
FIG. 10E is a cross-sectional view taken along line 10E-10E in FIG. 9.
Figure 10F:
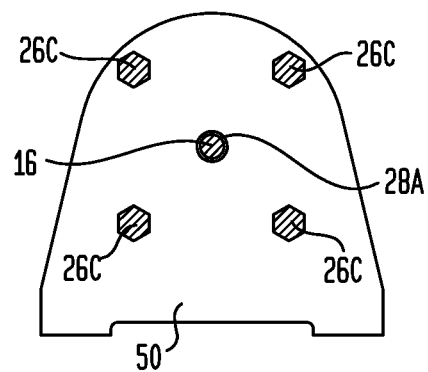
FIG. 10F is a cross-sectional view taken along line 10E-10F in FIG. 9.

As shown in FIGS. 10A-10C, the first and second magnet carriers 4 and 8 are of larger diameter than the intermediate magnet carrier 12. This allows the magnet carriers 4 and 8 to be conveniently secured to a support frame assembly 24 (see FIG. 8) that holds and positions the first and second magnet carriers at a desired spacing. The support frame assembly 24 also carries the main shaft 16.

Figure 8:
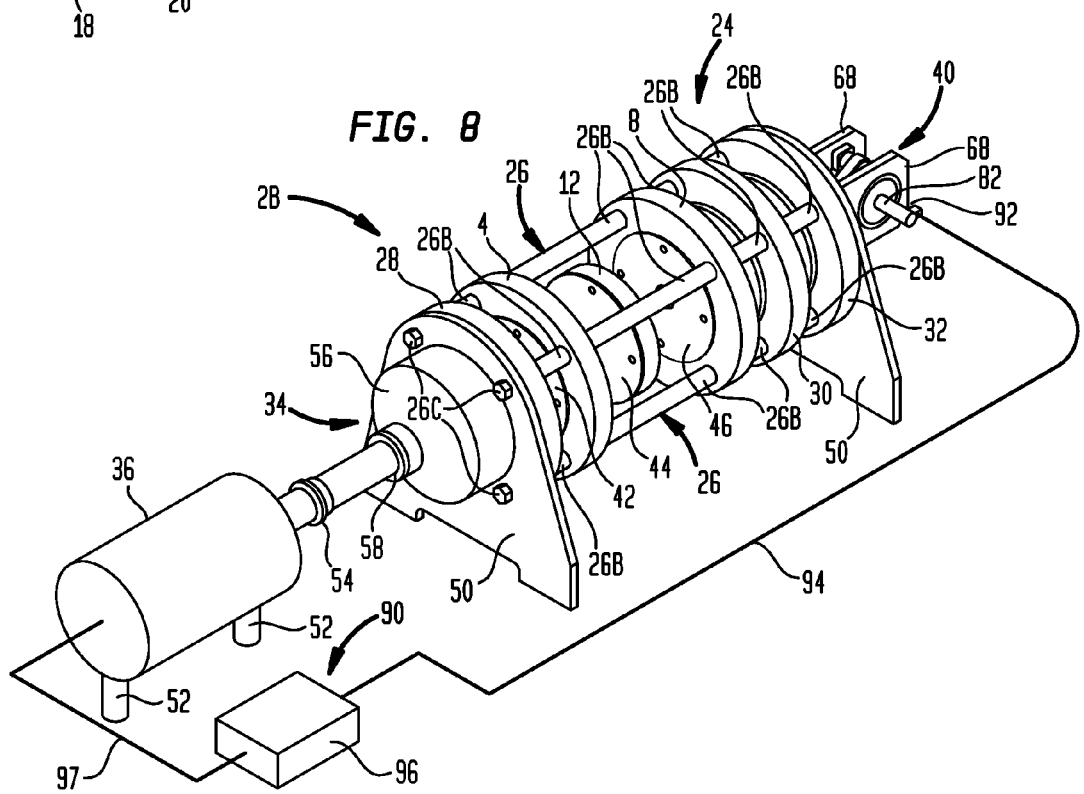
FIG. 8 is a perspective view showing another example construction of the magnetic drive apparatus of FIG. 1 in combination with an input component and an output component to provide a magnetic drive torque converter apparatus.
Figure 9:
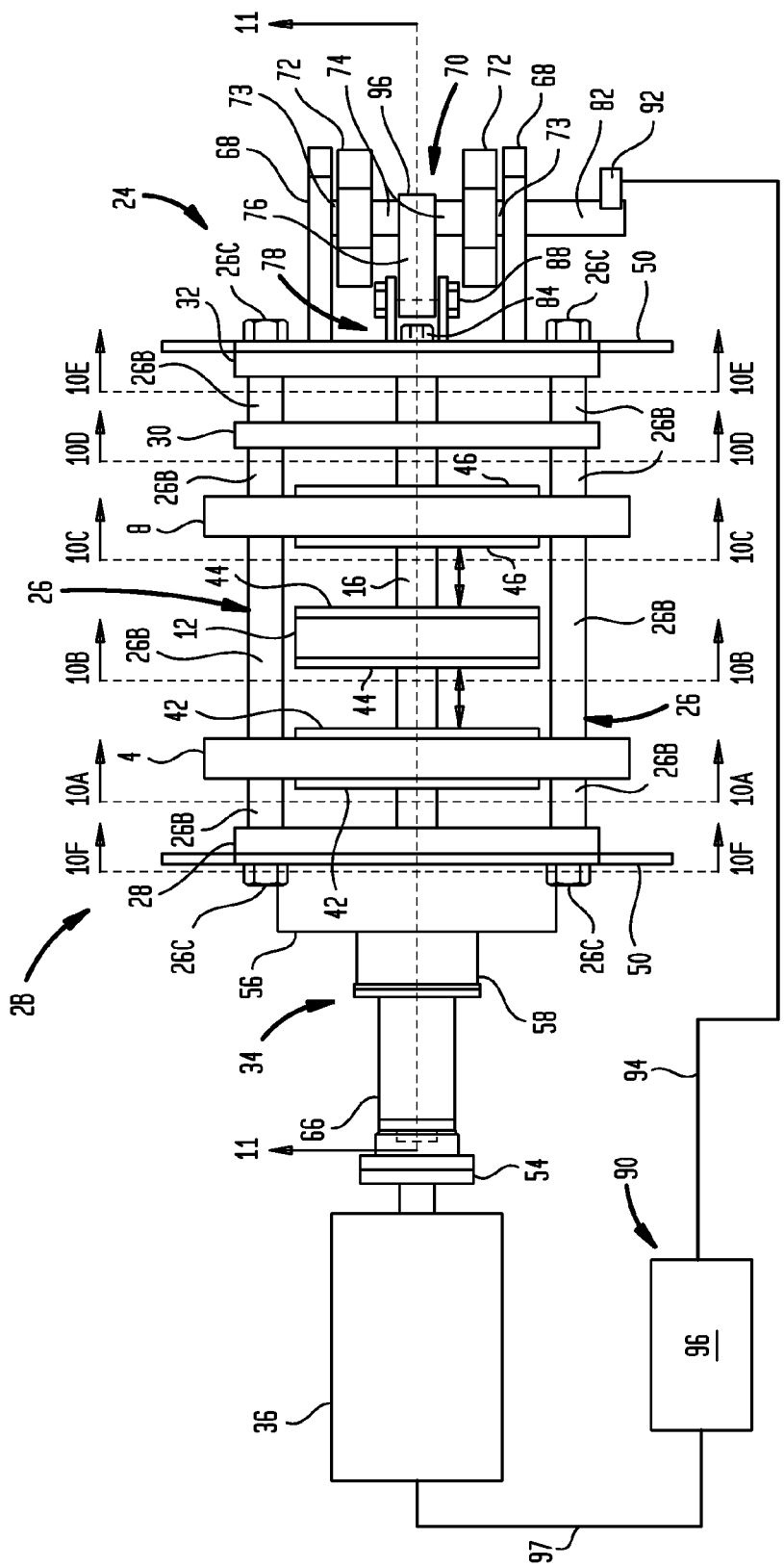
FIG. 9 is a top plan view showing the example magnetic drive apparatus construction of FIG. 8.

The support frame assembly 24 is constructed with a set of four longitudinal spool assemblies 26 that interconnect the first and second magnet carriers 4 and 8, but not the intermediate magnet carrier 12. The spool assemblies 26 also mount a set of stabilizing plates 28, 30 and 32 that are oriented substantially parallel to the magnet carriers 4 and 8. As shown in FIGS. 10A and 10C-10E, each spool assembly 26 may include an elongated rod 26A that extends through corresponding apertures formed in the magnet carriers 4 and 8, and in the stabilizing plates 28, 30 and 32. Each spool assembly 26 may also include a set of spacers 26B that mount on the elongated rod 26A between each pair of adjacent magnet carriers and/or stabilizing plates in order to properly space these components. As can be seen in FIGS. 8 and 9, each spool assembly 26 is shown to have four spacers 26B, one between the stabilizing plate 28 and the first magnet carrier 4, the second between the first magnet carrier 4 and the second magnet carrier 8, the third between the second magnet carrier 8 and the stabilizing plate 30, and the fourth between the stabilizing plate 30 and the stabilizing plate 32. The ends of the elongated rods 26A are threaded to receive retaining members 26C that secure the support frame 24 together. It will be appreciated that other arrangements for spacing the various magnet carriers and stabilizing plates may also be used, such as separate spacing rods connected between each pair of spaced components.

As best shown in FIG. 11, the stabilizing plate 28 is located adjacent to the first magnet carrier 4 and is used to support the main shaft 16 proximate to its first end portion 20. In particular, stabilizing plate 28 carries an input coupling assembly 34 on one side of a central opening 28A that accommodates the main shaft 16. The input coupling assembly 34 is internally configured to support the main shaft 16 for low friction reciprocating motion while imparting rotational forces thereto. The motor 36 is operatively connected to the input coupling assembly 34 to serve as a rotary input component that rotates the main shaft 16 during operation of the magnetic drive apparatus 2. The stabilizing plate 30 is located adjacent to the second magnet carrier 8 and is used to support the main shaft 16 proximate to its second end portion 22. In particular, stabilizing plate 30 has a central opening 30A that mounts a ball bearing assembly 38 to rotatably support the main shaft 16. The stabilizing plate 32 is located adjacent to stabilizing plate 30. It has a large central opening 32A that accommodates the main shaft 16, as well as components of the crankshaft assembly 40, which is mounted to the outside of stabilizing plate 32. The crankshaft assembly 40 serves as a rotary output component that is driven by reciprocation of the main shaft 16 during operation of the magnetic drive apparatus construction 2B.

As best shown in FIGS. 8, 9 and 11, each of the magnet carriers 4, 8 and 12 includes a respective pair of magnet retainer plates 42, 44 and 46 in order to secure their respective magnets 6A, 10A and 14A in position. The magnet retainer plates 42, 44 and 46 may be formed from any material that does not adversely affect the magnetic interactions between the magnets 6A, 10A and 14A. They may be respectively secured to the magnet carriers 4, 8 and 12 using any suitable mounting technique, such as with counter-sunk machine screws 48, as shown in FIGS. 10A, 10B and 10C.

As can be seen in FIG. 11, the central bore 12D of the intermediate magnet carrier 12 is fixed on the main shaft 16 for rotation and reciprocation therewith, for example, using a keyed shaft coupling arrangement (not shown). As also shown in FIG. 11, the central bores 4D and 8D of the first and second magnet carriers 4 and 8 are spaced from the main shaft 16 so that the main shaft is free to rotate and reciprocate relative to the first and second magnet carriers.

As can be seen in FIGS. 8, 9 and 11, the support plates 28 and 32 may include mounting members 50 for securing the support frame 24 to a support surface (not shown). The input motor 36 may likewise include mounting members 52 for securing the motor a support surface (not shown). The input motor 36 may be operatively connected to the input coupling assembly 34 in any suitable manner, such as by using a flanged coupling connection 54. The input coupling assembly 34 includes a base housing 56 that may be bolted or otherwise fixedly attached to the outside of the support plate 28. As shown in FIG. 11, the input coupling assembly 34 further includes a ball-spline unit 58 whose outside diameter is rotatably connected to the base housing 56 via a ball bearing assembly 60. The inside diameter of the ball-spline unit 58 includes plural longitudinal rows of ball bearing elements 62 arranged to engage corresponding longitudinal splines 64 that may be formed proximate to the first end portion 20 of the main shaft 16. The ball bearing elements 62 impart rotational forces to the main shaft 16 while allowing the shaft to reciprocate back and forth with minimal friction. A flanged cover tube 66 mounts to the end face of the ball-spline assembly 58, and is used to carry one side of the flanged coupling connection 54. The other side of the flanged coupling connection attaches to the output shaft of the motor 36. The cover tube 66 is long enough to accommodate the reciprocating movement of the first end portion 20 of the main shaft 16 therein.

With continuing reference to FIGS. 8, 9 and 11, the crankshaft assembly 40 may be configured with a pair of crankshaft support plates 68 that are carried by the stabilizing plate 32. The crankshaft support plates 68 are provided with main bearings (not shown) that rotatably carry a crankshaft 70. The crankshaft 70 includes a pair of counter weight/crank arm members 72. As shown in FIG. 9, a central portion of each counter weight/crank arm member 72 has an outwardly extending main journal 73 that is rotatably mounted to the main bearing of one of the crankshaft support plates 68. As additionally shown in FIG. 9, and also in FIG. 11, the crank arm end of each counter weight/crank arm member 72 supports one end of a connecting rod journal 74. The connecting rod journal 74 is attached to one end of a connecting rod 76 via a suitable bearing arrangement.

The other end of the connecting rod 76 is rotatably attached to a main shaft coupling assembly 78 via a clevis connection. As additionally shown in FIGS. 12A and 12B, the coupling assembly 78 is rotatably mounted to the second end portion 22 of the main shaft 16 so that the main shaft is free to rotate relative to the coupling assembly. The coupling assembly 78 may be configured with a tubular housing 80 into which is inserted a suitable bearing 82 (e.g., a flanged oilite bearing) that receives the second end portion 22 of the main shaft 16. A bolt 84 (see FIG. 11) that threads onto reduced diameter post at the main shaft second end portion 22 may be used to retain the coupling assembly 78 on the main shaft 16 during reciprocation thereof. The coupling assembly 78 includes a clevis 86 that is pinned to the connecting rod 76 with a bushed clevis bolt arrangement 88. It will be seen from FIGS. 11, 12A and 12B that the coupling assembly 78 will allow free rotation of the main shaft 16 at its second end portion 22 due to the bearing 82. At the same time, the coupling assembly 78 will transmit the reciprocal motion of the main shaft 16 in its first and second stroke directions through the connecting rod 76 to the crankshaft 70, thereby causing the crankshaft to rotate. As can be seen in FIG. 9, an output end 82 of the crankshaft 70 may be connected to a desired output load (not shown).

As previously noted, in a prototype implementation of the magnetic drive torque converter apparatus shown in FIGS. 8-12B, the four magnets 6A, 10A and 14A on each respective magnet carrier 4, 8 and 12 were implemented with 3 inch diameter, 1 inch thick, grade N52 neodymium disk magnets from K & J Magnetics, Inc. Each magnet 6A, 10A and 14A was axially magnetized and was rated by the manufacturer as producing a maximum push/pull force of approximately 360 pounds. The magnets 6A, 10A and 14A were arranged on their respective magnet carriers 4, 8 and 12 so that the magnet centers were 2.75 inches from the magnet carrier centers. The stroke length of the magnet carrier relative reciprocation was 5.5 inches. The crank arm length provided by the crank arm portion of counter weight/crank arm members 72 was 2.75 inches. The length of the connecting rod 76 was 10 inches. The magnet carriers 4, 8 and 12 were 1 inch thick and the magnet retainers 42, 44 and 46 were 0.25 inches thick. At the end of each stroke, the separation gap between the closest together set of opposing magnet retainers (i.e., 42/44 or 46/44) was 0.625 inches, such that the minimum spacing between opposing magnets (pole face to pole face) was 0.625+(2×0.25)=1.125 inches. At midstroke, the separation gap between each set of opposing magnet retainers (i.e., 42/44 and 46/44) was 3.375 inches, such that the maximum spacing between opposing magnets (pole face to pole face) was 3.375+(2×0.25)=3.875 inches.

The magnetic drive torque converter apparatus shown in FIGS. 8-12B may be synchronized in any suitable manner so that rotation of the main shaft 16 is timed with respect to rotation of the crankshaft 70 (as driven by reciprocation of the main shaft). As shown in FIGS. 8 and 9, an example synchronization device 90 may include a sensor 92 that monitors crankshaft position (e.g., a rotary encoder), and a signal-carrying feedback circuit 94 that provides a crankshaft position signal to a programmable servo controller 96 (e.g., implemented as a programmable digital device) that controls the input motor 36 (via a control circuit 97) according to the position signal. Any of various existing robotic servo controller systems may be used for this purpose. Other types of synchronization device could also be used to synchronize operation of the illustrated magnetic drive torque converter apparatus, including but not limited to, a mechanical timing system that mechanically couples the input drive motor's rotary input to the crankshaft's rotary output.

The concept of synchronizing a magnetic drive apparatus as disclosed herein was discussed above. In the magnetic drive torque converter apparatus of FIGS. 8-12B, the servo controller 96 is programmed to control the main shaft's rotational position based on the angular position of the crankshaft 70, which corresponds via a definable mathematical relationship to the main shaft's reciprocation position (see discussion of FIG. 5 above). As previously noted, the magnetic dead zones can be made to coincide with the main shaft 16 being proximate to its top dead center and bottom dead center reciprocation positions, and so that the magnetic power zones occur between these positions. As also noted, the servo controller 96 could also be programmed to synchronize rotation of the main shaft 16 so that the dead zones are dynamically advanced or retarded with respect to the top dead center and bottom dead center reciprocation positions, or to vary the position or size of the dead zones.

FIGS. 13A-13H illustrate the rotational and reciprocation positions of the intermediate magnet carrier 12 with respect to the first and second magnet carriers 4 and 8 during two reciprocal strokes of the illustrated magnetic drive torque converter apparatus. In these figures, the main shaft 16 is synchronized by the servo controller 96 so that the two dead zones are centered at the 0° and 180° reciprocation positions of the main shaft, and so that the power zones are centered at the 90° and 270° reciprocation positions. FIGS. 13A-13H thus correspond to the timing arrangement shown in FIGS. 6A-6H, respectively. Each dead zone and each power zone is approximately 90° wide.

Figure 13A:
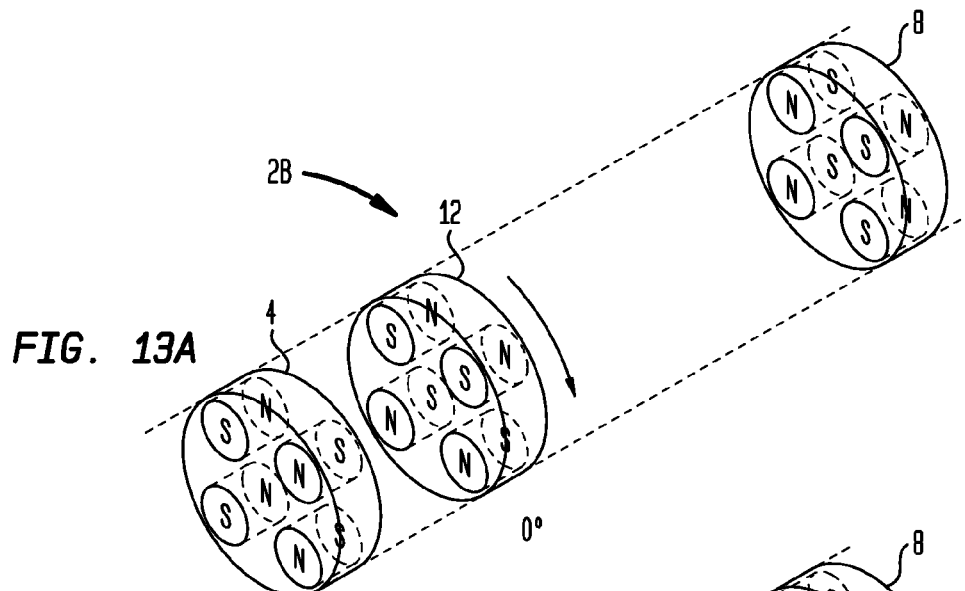
Figure 13B:
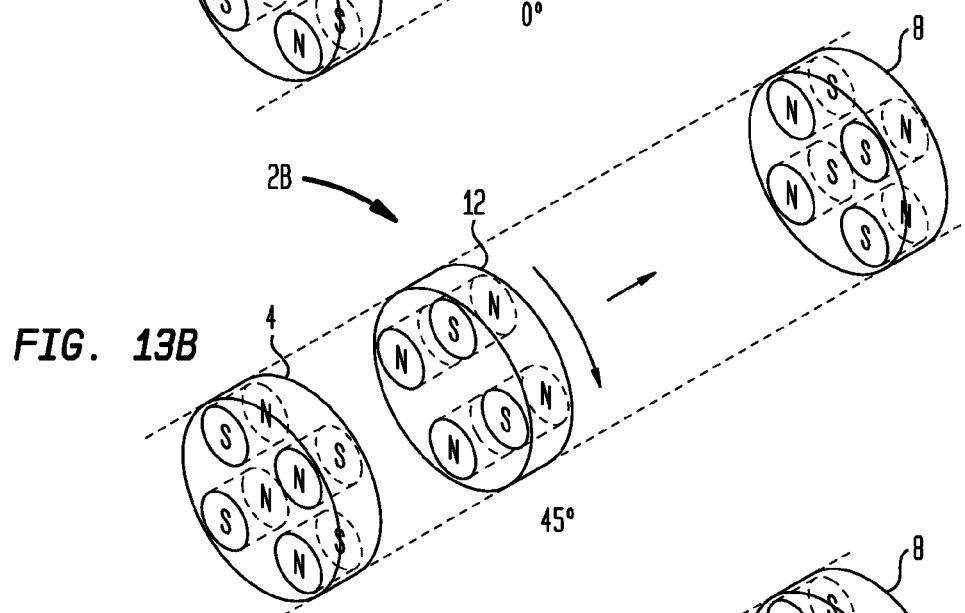
Figure 13C:
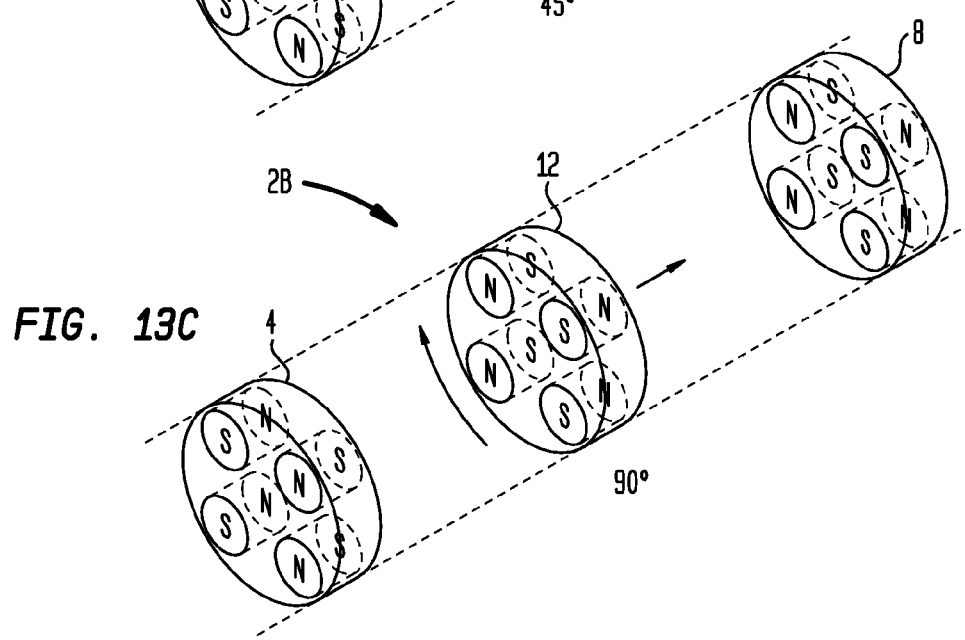
Figure 13G:
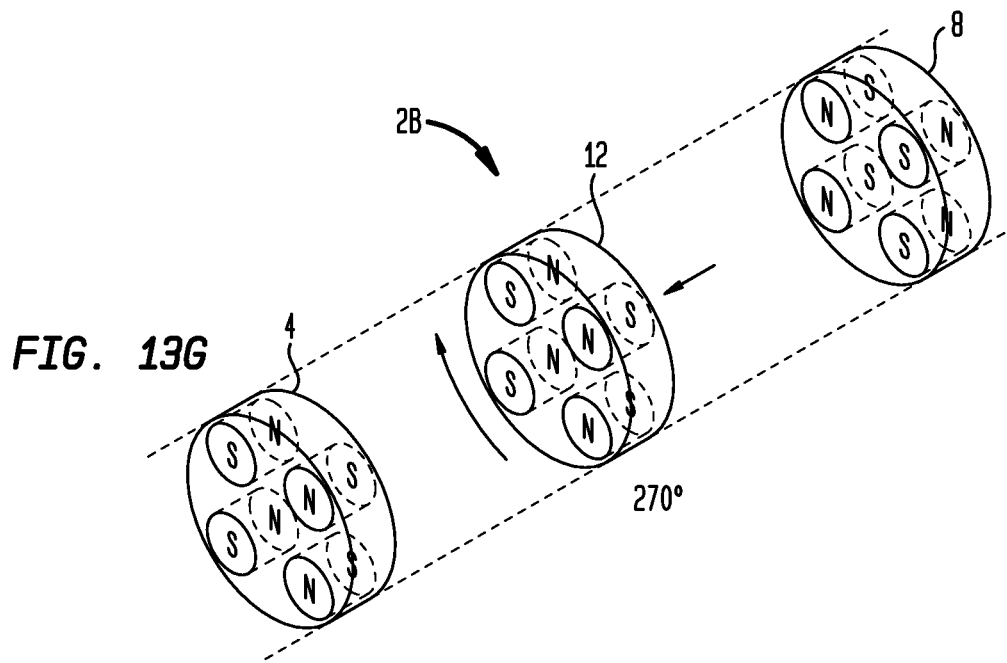
Figure 13H:
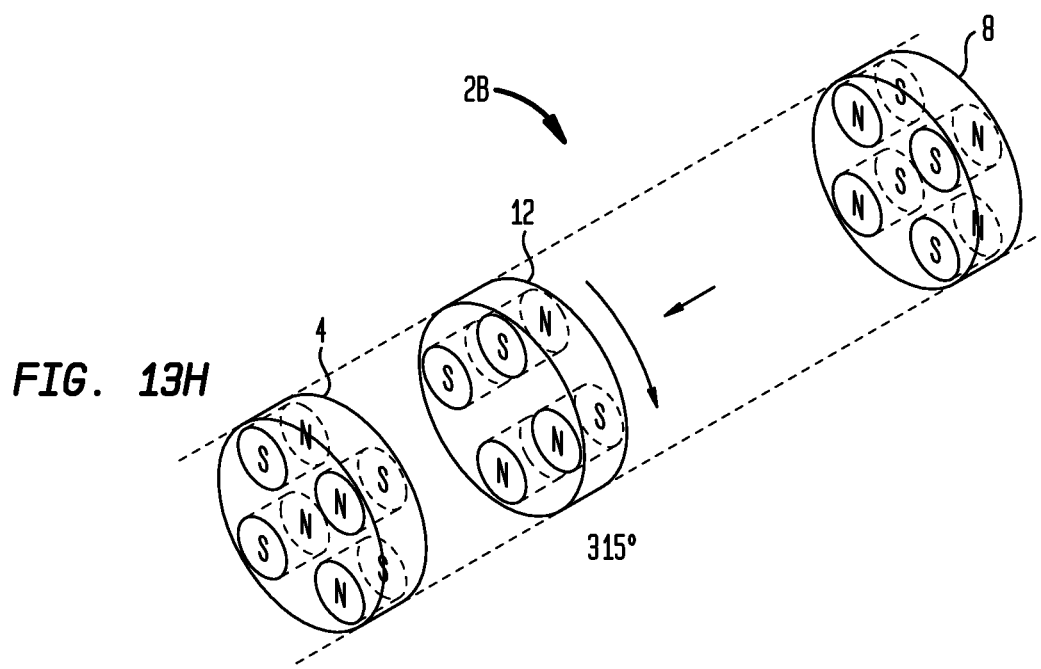

FIG. 13A shows the intermediate magnet carrier 12 at the 0° TDC reciprocation position and in the middle of a first dead zone. FIG. 13B shows the 45° reciprocation position of the intermediate magnet carrier 12 wherein the intermediate magnet carrier is transitioning out of the first dead zone and into a first power zone. FIG. 13C shows the 90° reciprocation position of the intermediate magnet 12 wherein the intermediate magnet carrier is in the middle of the first power zone. FIG. 13D shows the 135° reciprocation position of the intermediate magnet carrier 12 wherein the intermediate magnet carrier is transitioning out of the first power zone and into a second dead zone. FIG. 13E shows the 180° BDC reciprocation position of the intermediate magnet carrier 12 wherein the intermediate magnet carrier is in the middle of the second dead zone. FIG. 13F shows the 225° reciprocation position of the intermediate magnet carrier 12 wherein the intermediate magnet carrier is transitioning out of the second dead zone and into a second power zone. FIG. 13G shows the 270° reciprocation position of the intermediate magnet 12 wherein the intermediate magnet carrier is in the middle of the second power zone. FIG. 13H shows the 315° reciprocation position of the intermediate magnet carrier 12 wherein the intermediate magnet carrier is transitioning out of the second power zone and returning to the first dead zone.

Figure 14:
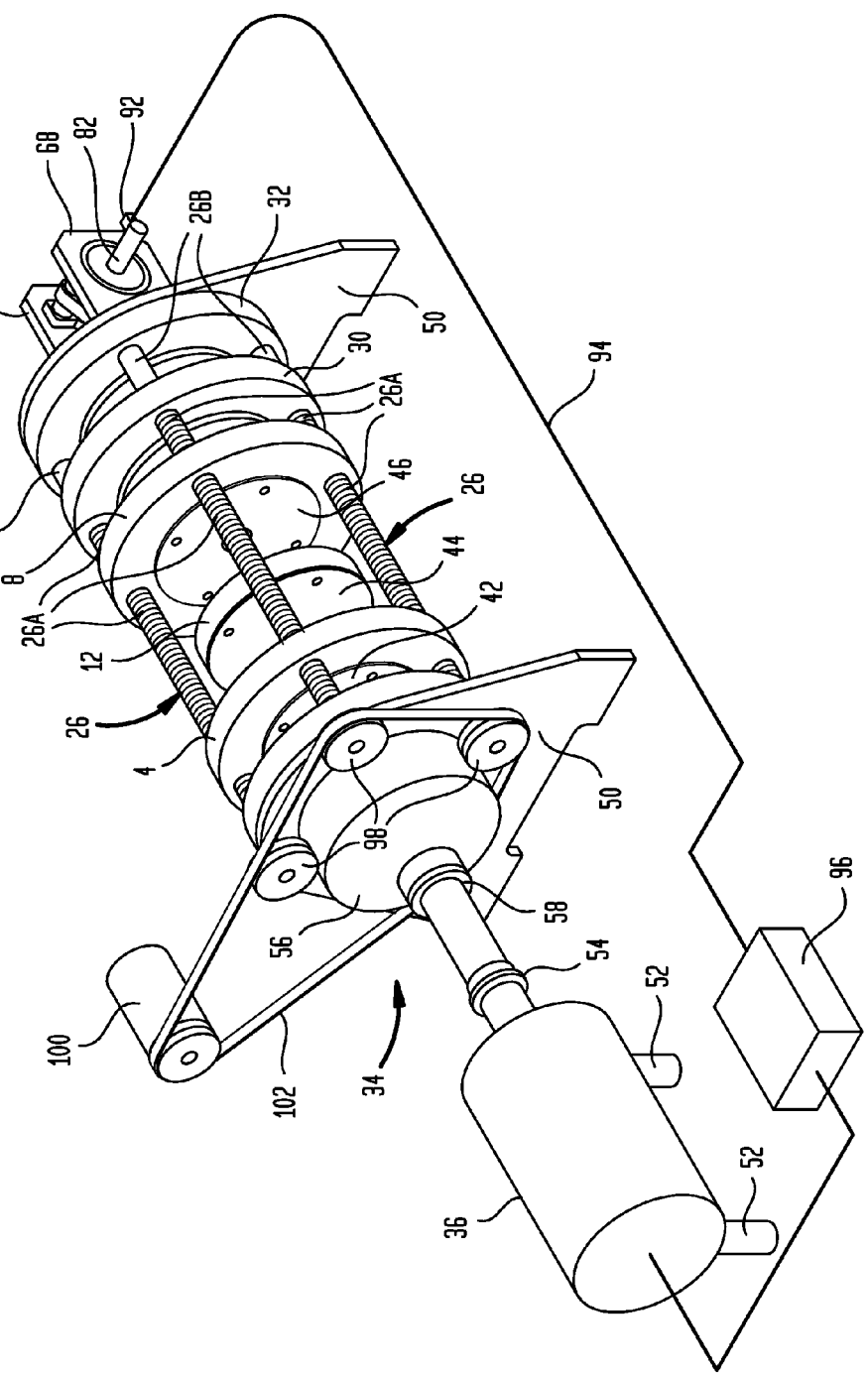
FIG. 14 is a perspective view showing a modification of the example magnetic drive apparatus construction of FIG. 8 in which the first and second magnet carriers are adjustably positionable.

FIG. 14 illustrates a further magnetic drive apparatus construction 2C wherein magnet carrier spacing adjustment capability is provided. This construction is substantially similar to the construction 2B of FIGS. 8-12B, except that the first and second magnet carriers 4 and 8 are dynamically adjustably positionable during operation in order to change their spacing relative to the intermediate magnet carrier 12, and thereby adjust the strength of the magnetic interactions. To achieve this effect, the spool assemblies 26 can be modified by removing the spacing members 26B on each side of the first and second magnet carriers 4 and 8 to expose the threaded rods 26A. The first and second magnet carriers 4 and 8 may then be modified so that they threadably receive the threaded rods 26A. Rotation of the threaded rods 26A will thus re-position the first and second magnet carriers 4 and 8 toward and away from the intermediate magnet carrier 12 (depending on the direction of rod rotation). If needed, additional spacing members (not shown) may be added to maintain the positions of the stabilizing plates 28, 30 and 32 relative to each other. Rod rotation members, such as pulleys 98, may be mounted to one end of each threaded rod 26A. The rod rotation members may be driven by a suitable drive mechanism. For example, if the pulleys 98 are used, the drive mechanism may include a drive motor 100 that is operatively coupled to the pulleys 98, such as by way of a drive belt 102. The drive motor 100 may be connected to a suitable control system (not shown) that adjusts the positioning of the first and second magnet carriers 4 and 8 whenever it is desired to relax the magnetic interaction forces, such as at start-up time.

Although each of the magnetic drive apparatus embodiments discussed above are based on permanent magnet arrangements with four magnets each, other magnet arrangements would also be possible. Examples include, but are not limited to, magnet arrangements comprising eight magnets, twelve magnets, sixteen magnets, twenty magnets, twenty-four magnets, etc. Like the illustrated four-magnet arrangements, these alternative magnet arrangements may be configured as a symmetrical magnet pattern that defines a polygonal shape corresponding to the number of magnets in each arrangement. Magnet arrangements having two (or more) polygonal magnet patterns in a nested relationship would also be possible. On each magnet carrier side, the magnet pattern may comprise n-magnet groupings with n adjacent magnetic poles of like polarity in each grouping. In this way, magnet carrier relative rotation will produce changing magnetic interactions each time the opposing magnetic poles are rotatably advanced into mutual coaxial alignment. As in the case of the previously-described four-magnet arrangements, there will be magnet carrier relative rotation positions wherein all opposing magnetic poles in the magnetic interaction zone between any two opposing magnet carriers are coaxially aligned in either NN or NS relationships. In other magnet carrier relative rotation positions, the opposing magnetic poles in the magnetic interaction zone between any two opposing magnet carriers will be coaxially aligned in both NN and NS relationships, with the number of NN and NS relationships being equal. In general, it is expected that these characteristic will be produced by any magnet arrangement having an even number of magnets, an equal number of N and S poles on any given magnet carrier side, and wherein the N and S poles are arranged in magnet groupings having an even number of adjacent magnets of like-polarity.

Although the magnetic drive apparatus constructions disclosed thus far have three magnet carriers 4, 8 and 12 arranged to form dual magnetic interaction zones 15A and 15B, other constructions would also be possible. For example, a magnetic drive apparatus in accordance with the present disclosure may be constructed with two opposing magnet carriers arranged to form a single magnetic interaction zone. As in the previous constructions, the opposing magnet arrangements are configured to produce magnetic interactions when the opposing magnet carriers undergo relative rotation.

FIGS. 15-18 illustrate an example magnetic drive apparatus construction 2D representing a single-magnetic interaction zone embodiment that uses two magnet carriers. In the magnetic drive apparatus construction 2D, there is only the first magnet carrier 4 and the intermediate magnet carrier 12 providing a single magnetic interaction zone 15A. The second magnet carrier 8 and the second magnetic interaction zone 15B are not present. The magnetic interactions in the magnetic interaction zone 15A during relative rotation of the opposing magnet carriers 4 and 12 (see arrows "A" and "B") produce power stroke forces that cause the magnet carriers to undergo relative reciprocation in first and second stroke directions during power zone portions of the relative rotation.

Figure 15:
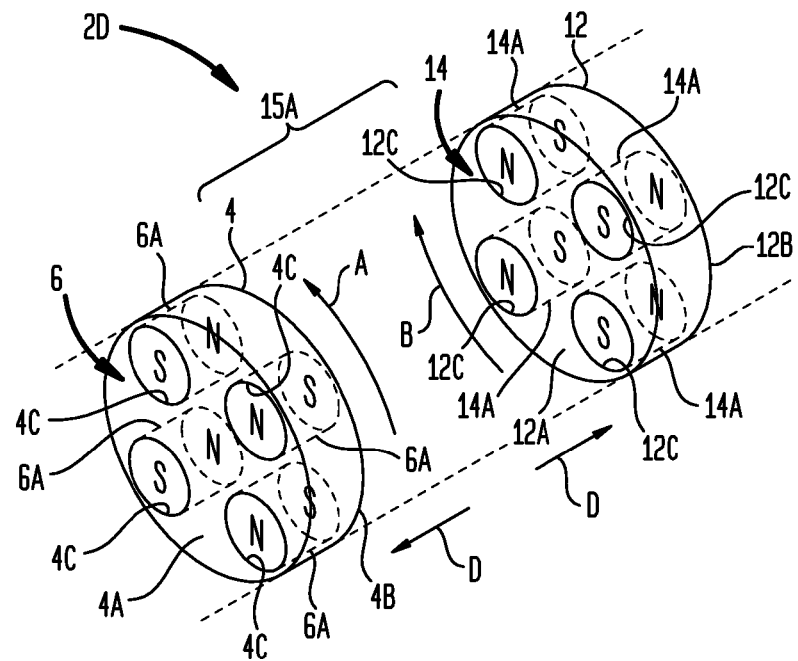
FIG. 15 is a diagrammatic perspective view showing an example two-magnet carrier magnetic drive apparatus construction in a first operational position.
Figure 16:
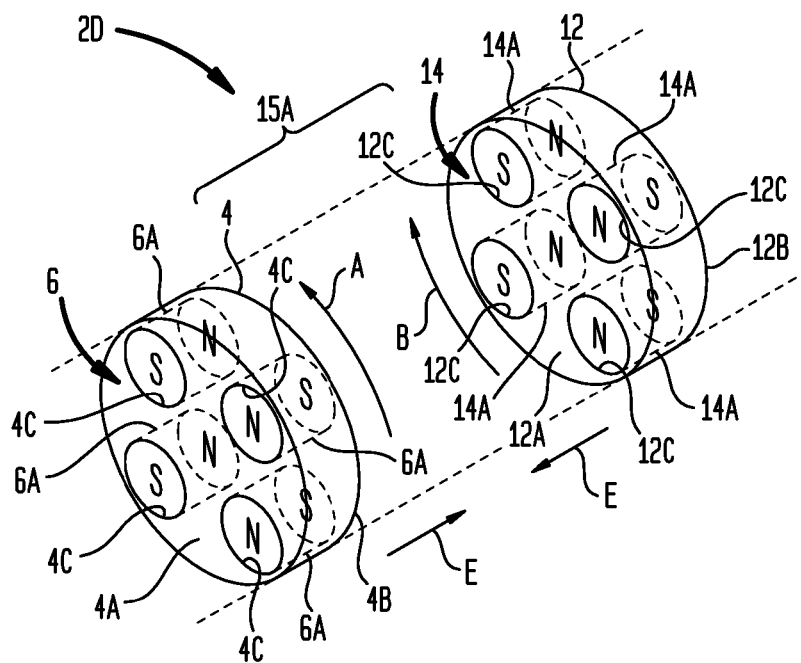
FIG. 16 is a diagrammatic perspective view showing the magnetic drive apparatus construction of FIG. 15 in a second operational position.
Figure 17:
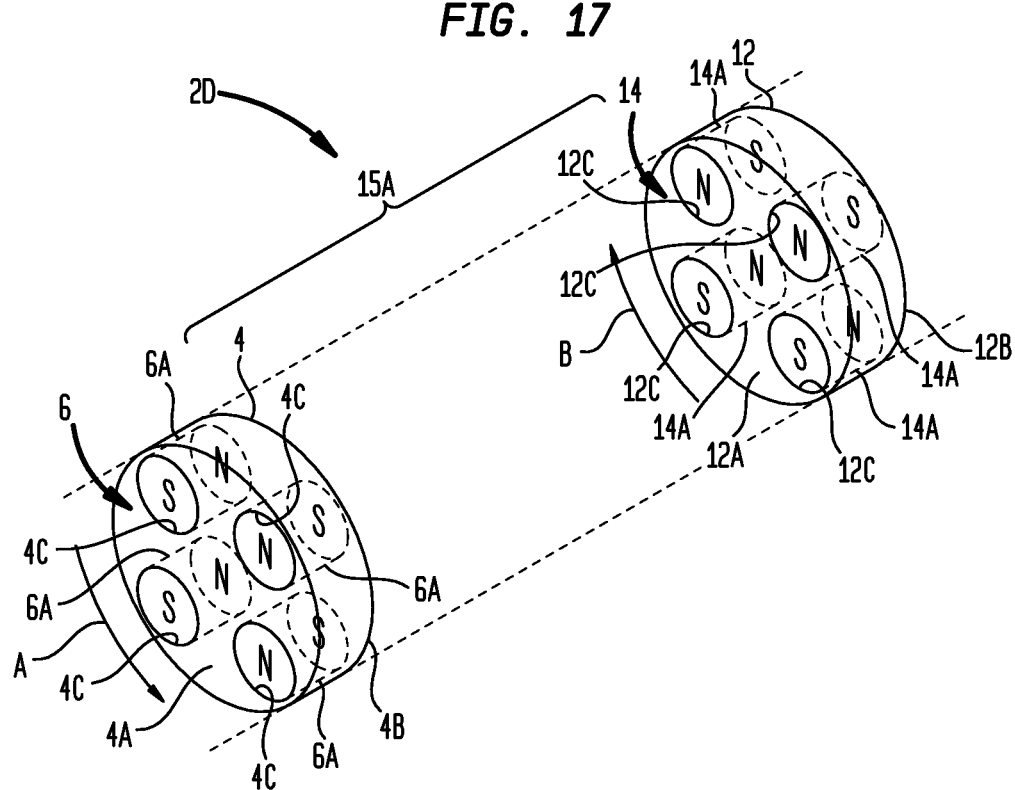
FIG. 17 is a diagrammatic perspective view showing the magnetic drive apparatus construction of FIG. 15 in a third operational position.
Figure 18:
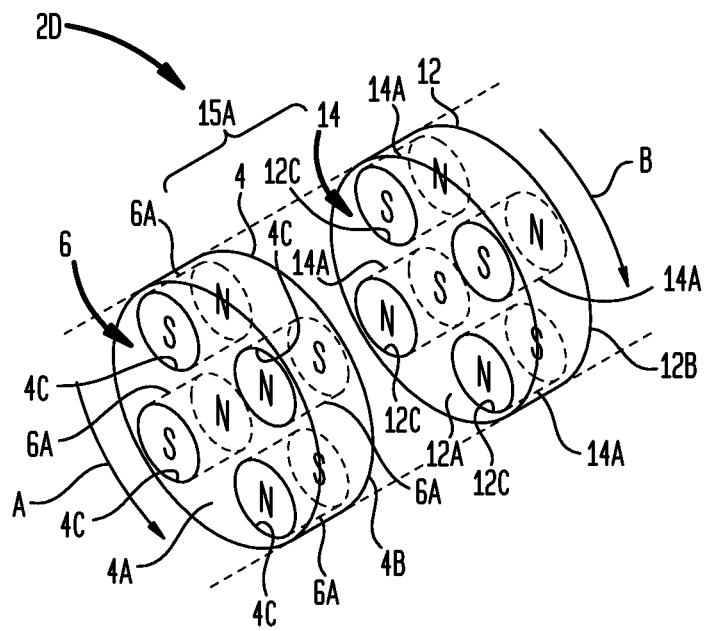
FIG. 18 is a diagrammatic perspective view showing the magnetic drive apparatus construction of FIG. 15 in a fourth operational position.

The power zones are illustrated in FIGS. 15 and 16, and are characterized by opposing magnetic poles of the opposing magnet arrangements 6 and 14 being mutually coaxially aligned and producing maximum push or pull magnetic forces. In particular, FIG. 15 shows a first power zone wherein the magnet carriers 4 and 12 are repelled away from each other (see arrows "D"), and FIG. 16 shows a second power zone wherein the magnet carriers are attracted toward each other (see arrows "E"). The magnetic interactions produce substantially no power stroke forces during dead zone portions of the relative rotation. The dead zone positions are exemplified in FIGS. 17 and 18, and are characterized by opposing magnetic poles of the opposing magnet arrangements 6 and 14 being mutually coaxially aligned but producing a substantially equal balance of push and pull magnetic forces. As in the previous embodiments, relative rotation and reciprocation may be synchronized so that the dead zones coincide with top dead center and bottom dead center relative reciprocation positions of the magnet carriers 4 and 12, and so that the power zones occur when the magnetic drive apparatus is between the top dead center and bottom dead center relative reciprocation positions. Likewise, the relative rotation and reciprocation could be synchronized so that said dead zones are dynamically adjustable in position or size.

It will be appreciated that additional magnetic drive apparatus constructions may be implemented using multiple sets of magnet carriers. One example configuration is shown by the magnetic drive apparatus construction 2E of FIG. 19. The magnetic drive apparatus construction 2E is based on the magnetic drive apparatus construction 2A of FIG. 7, except that there are two sets of magnet carriers, each comprising the first, second and intermediate magnet carriers 4, 8 and 12, mounted on the main shaft 16. As in the magnetic drive apparatus construction 2A, an input drive component 21 is operatively coupled to the first end portion 20 of the main shaft 16. The second end portion 22 of the main shaft 16 is operatively coupled to a single rotary output 23, such as a crankshaft.

Figure 20:
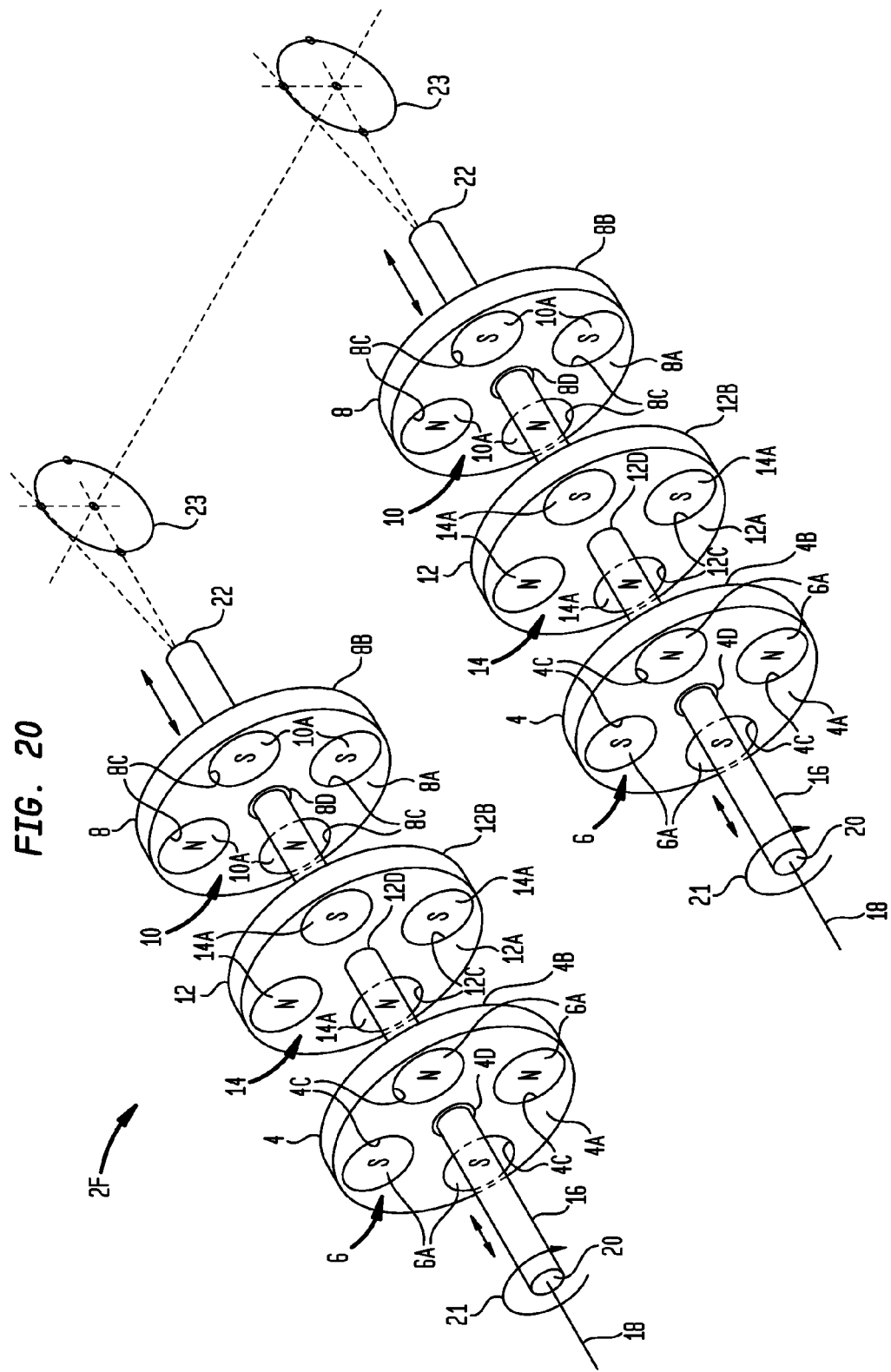
FIG. 20 is a perspective view showing another example magnetic drive apparatus construction with multiple sets of magnet carriers driving a common output component.

FIG. 20 shows another magnetic drive apparatus construction 2F that is also based on the magnetic drive apparatus construction 2A of FIG. 7, except that there are two main shafts 16, each with its own set of first, second and intermediate magnet carriers 4, 8 and 12. Each main shaft 16 has its own input drive component 21 operatively coupled to the first shaft end portion 20. However, the second end portion 22 of each main shaft 16 is operatively coupled to a single rotary output 23, such as a crankshaft.

Figure 19:
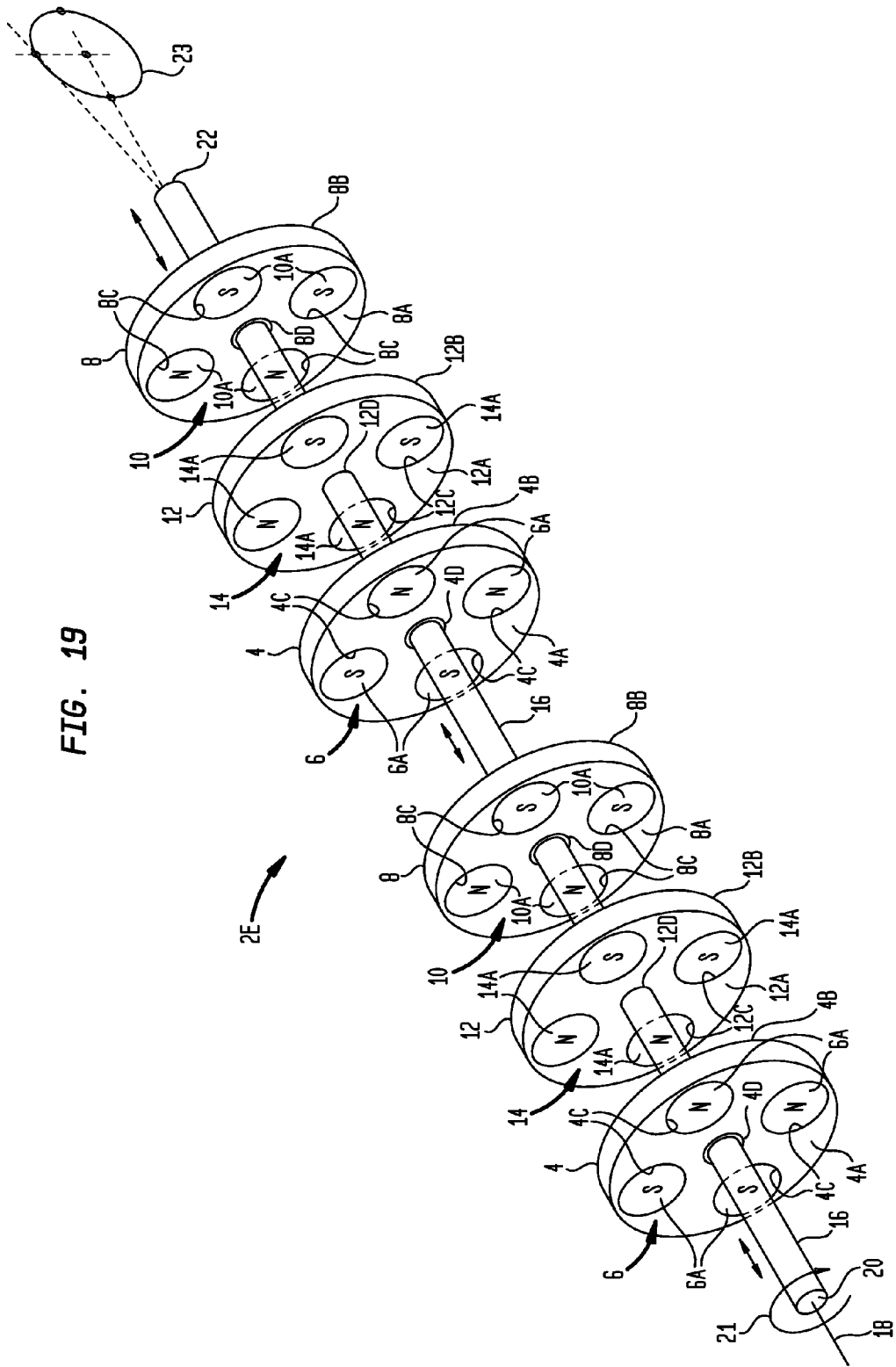
FIG. 19 is a perspective view showing an example magnetic drive apparatus construction with multiple sets of magnet carriers driving a common output component.

It will be appreciated that the embodiments of FIGS. 19 and 20 could have any number of magnet carrier sets. As shown, each magnet carrier set could have three magnet carriers forming two magnetic interaction zones. Alternatively, some or all of the magnet sets could be based on the embodiment of FIGS. 15-18, with two magnet carriers forming one magnetic interaction zone.

Accordingly, several magnetic drive apparatus and related operational methods have been disclosed. Although various embodiments have been described, it should be apparent that many variations and alternative embodiments could be implemented in accordance with the inventive concepts disclosed herein. It is understood, therefore, that the invention is not to be in any way limited except in accordance with the spirit of the appended claims and their equivalents.

What is claimed is:

1. A magnetic drive apparatus, comprising:
  a first magnet carrier carrying a first permanent magnet arrangement;
  a second magnet carrier carrying a second permanent magnet arrangement;
  an intermediate magnet carrier disposed between said first and second magnet carriers and carrying a third permanent magnet arrangement;
  said intermediate magnet carrier and said first and second magnet carriers being arranged for rotation relative to each other (relative rotation);
  said first permanent magnet arrangement, said second permanent magnet arrangement and said third permanent magnet arrangement being configured to produce magnetic interactions when said intermediate magnet carrier and said first and second magnet carriers undergo said relative rotation;

said magnetic interactions producing power stroke forces that cause said intermediate magnet carrier and said first and second magnet carriers to undergo reciprocation relative to each (relative reciprocation) other in first and second stroke directions during power zone portions of said relative rotation;

said magnetic interactions producing substantially no power stroke forces during dead zone portions of said relative rotation, said dead zones comprising relative rotational positions of said magnet carriers wherein opposing magnetic poles of said first permanent magnet arrangement, said second permanent magnet arrangement and said third permanent magnet arrangement are mutually coaxially aligned but produce a substantially equal balance of push and pull magnetic forces; and said relative rotation and said relative reciprocation being synchronizable so that said dead zones can be made to occur proximate to top dead center and bottom dead center positions of said relative reciprocation, and so that said power zones occur between said top dead center and bottom dead center relative reciprocation positions.

2. The apparatus of claim 1, wherein a transition zone exists at each transition between one of said dead zones and one of said power zones, each said transition zone representing a transition period between said magnet carriers experiencing substantially no power stroke forces and substantially maximum power stroke forces.

3. The apparatus of claim 1, wherein said first permanent magnet arrangement, said second permanent magnet arrangement and said third permanent magnet arrangement each comprise a set of magnets arranged in a magnet pattern, said magnets being oriented on their respective magnet carriers to present a first magnetic pole on a first magnet carrier side and a second magnetic pole on a second magnet carrier side.

4. The apparatus of claim 3, wherein each magnet pattern on any given magnet carrier side comprises at least a first n-magnet grouping having n adjacent magnetic poles of a first polarity and a second n-magnet grouping having n adjacent magnetic poles of a second polarity.

5. The apparatus of claim 4, wherein each magnet pattern has four magnets arranged in a first two-magnet grouping having two adjacent N magnetic poles and a second two-magnet grouping having two adjacent S magnetic poles.

6. The apparatus of claim 5, wherein said first magnet carrier has an interior side that faces a first side of said intermediate magnet carrier to form a first magnetic interaction zone, and wherein said second magnet carrier has an interior side that faces a second side of said intermediate magnet carrier to form a second magnetic interaction zone.

7. The apparatus of claim 6, wherein said power zones comprise relative rotational positions of said magnet carriers wherein said opposing magnetic poles of said first permanent magnet arrangement, said second permanent magnet arrangement and said third permanent magnet arrangement are mutually coaxially aligned with all of said opposing magnetic poles in said first and second magnetic interaction zones either mutually repelling or mutually attracting each other.

8. The apparatus of claim 7, wherein said power stroke forces produce said relative reciprocation in said first stroke direction when said opposing magnetic poles in said first magnetic interaction zone all mutually repel each other while said opposing magnetic poles in said second magnetic interaction zone all mutually attract each other, and wherein said power stroke forces produce said relative reciprocation in said second stroke direction when said opposing magnetic poles in said first magnetic interaction zone all mutually attract each other while said opposing magnetic poles in said second magnetic interaction zone all mutually repel each other.

9. The apparatus of claim 6, wherein said dead zones comprise relative rotational positions of said magnet carriers wherein one half of said opposing magnetic poles in said first and second magnetic interaction zones are aligned to mutually repel each other and the other half of said opposing magnetic poles in said first and second magnetic interaction zones are aligned to mutually attract each other.

10. The apparatus of claim 1, further including a main shaft extending through each of said magnet carriers, said main shaft having a central longitudinal axis and being rotatable about said longitudinal axis and capable of reciprocation along said longitudinal axis;

a first end portion of said main shaft being adapted for operative coupling to an input component that rotates said main shaft;

a second end portion of said main shaft being adapted for operative coupling to an output component that is driven by reciprocation of said main shaft;

said main shaft being rotatably coupled to either said intermediate magnet carrier or said first and second magnet carriers such that rotation of said main shaft about its longitudinal axis produces said relative rotation between said intermediate magnet carrier and said first and second magnet carriers; and said main shaft being axially coupled to either said intermediate magnet carrier or said first and second magnet carriers such said relative reciprocation between said intermediate magnet carrier and said first and second magnet carriers in said first and second stroke directions produces reciprocation of said main shaft along its longitudinal axis.

11. The apparatus of claim 1, wherein said first and second magnet carriers are adjustably positionable toward and away from said intermediate magnet carrier in order to adjust the strength of said magnetic interactions.

12. The apparatus of claim 11, wherein said first and second magnet carriers are positionable toward and away from said intermediate magnet carrier by a power driven magnet carrier positioning system.

13. A magnetic drive torque converter apparatus, comprising:

a first magnet carrier carrying a first permanent magnet arrangement;

a second magnet carrier carrying a second permanent magnet arrangement;

an intermediate magnet carrier disposed between said first and second magnet carriers and carrying a third permanent magnet arrangement;

an input component operatively coupled to either said intermediate magnet carrier or said first and second magnet carriers to produce relative rotation between said intermediate magnet carrier and said first and second magnet carriers;

said first permanent magnet arrangement, said second permanent magnet arrangement and said third permanent magnet arrangement being configured to produce magnetic interactions when said input component produces said relative rotation;

said magnetic interactions producing power stroke forces that cause said intermediate magnet carrier and said first and second magnet carriers to undergo relative reciprocation in first and second stroke directions during power zone portions of said relative rotation;

an output component operatively coupled to either said intermediate magnet carrier or said first and second magnet carriers such that said relative reciprocation in said first and second stroke directions actuates said output component;

said magnetic interactions producing substantially no power stroke forces during dead zone portions of said relative rotation, said dead zones comprising relative rotational positions of said magnet carriers wherein opposing magnetic poles of said first permanent magnet arrangement, said second permanent magnet arrangement and said third permanent magnet arrangement are mutually coaxially aligned but produce a substantially equal balance of push and pull magnetic forces; and said relative rotation and said relative reciprocation being synchronizable so that said dead zones can be made to occur proximate to top dead center and bottom dead center positions of said relative reciprocation, and so that said power zones occur between said top dead center and bottom dead center relative reciprocation positions.

14. The apparatus of claim 13, wherein said relative rotation comprises said first and second magnet carriers rotating in the same direction or in opposite directions with respect to each other.

15. The apparatus of claim 13, further including:

a main shaft extending through each of said magnet carriers, said main shaft having a central longitudinal axis and being rotatable about said longitudinal axis and capable of reciprocation along said longitudinal axis;

said input component being operatively coupled to a first end portion of said main shaft to rotate said main shaft;

said output component being operatively coupled to a second end portion of said main shaft to be driven by reciprocation of said main shaft;

said main shaft being rotatably coupled to either said intermediate magnet carrier or said first and second magnet carriers such that said rotation of said main shaft about its longitudinal axis by said input component produces said relative rotation between said intermediate magnet carrier and said first and second magnet carriers; and said main shaft being axially coupled to either said intermediate magnet carrier or said first and second magnet carriers such that said relative reciprocation between said intermediate magnet carrier and said first and second magnet carriers in first and second stroke directions produces said reciprocation of said main shaft along its longitudinal axis.

16. The apparatus of claim 15, further including a synchronization device operatively coupled to provide said synchronizing by synchronizing said main shaft so that said dead zones are centered proximate to said top dead center and bottom dead center positions.

17. The apparatus of claim 16, wherein said main shaft is synchronized so that said dead zones are dynamically adjustable in position or size.

18. The apparatus of claim 16, wherein said synchronization device comprises said input component, said output component, and a sensor/feedback system for controlling said input component based on positioning of said output component.

19. The apparatus of claim 18, wherein said input component comprises a rotary drive motor connected to said main shaft by a ball-spline input coupling assembly, said output component comprises a crankshaft connected to said main shaft by a connecting rod, and said sensor/feedback system comprises a sensor arranged to sense rotation of said crankshaft and a controller operable to control said rotary drive motor in response to a crankshaft position signals from said sensor.

20. A magnetic drive apparatus, comprising:

first and second opposing magnet carriers respectively carrying opposing magnet arrangements;

said opposing magnet arrangements being configured to produce magnetic interactions when said opposing magnet carriers undergo relative rotation;

said magnetic interactions producing power stroke forces that cause said opposing magnet carriers to undergo relative reciprocation in first and second stroke directions during power zone portions of said relative rotation;

said magnetic interactions producing substantially no power stroke forces during dead zone portions of said relative rotation, said dead zones comprising relative rotational positions of the magnet carriers wherein opposing magnetic poles of said opposing magnet arrangements are mutually coaxially aligned but produce a substantially equal balance of push and pull magnetic forces; and said relative rotation and said relative reciprocation being synchronizable so that said dead zones can be made to occur proximate to top dead center and bottom dead center relative reciprocation positions of said magnet carriers, and so that said power zones occur between said top dead center and bottom dead center relative reciprocation positions.

21. A permanent magnet drive method, comprising:

providing opposing magnet carriers respectively carrying opposing magnet arrangements, said opposing magnet arrangements being configured to produce magnetic interactions when said opposing magnet carriers undergo relative rotation;

inducing relative rotation between said opposing magnet carriers to produce said magnetic interactions;

said magnetic interactions producing power stroke forces that cause said opposing magnet carriers to undergo relative reciprocation in first and second stroke directions during power zone portions of said relative rotation;

said magnetic interactions producing substantially no power stroke forces during dead zone portions of said relative rotation, said dead zones comprising relative rotational positions of the magnet carriers wherein opposing magnetic poles of said opposing magnet arrangements are mutually coaxially aligned but produce a substantially equal balance of push and pull magnetic forces; and synchronizing said relative rotation and said relative reciprocation so that said dead zones occur proximate to top dead center and bottom dead center positions of said relative reciprocation, and so that said power zones occur between said top dead center and bottom dead center relative reciprocation positions.

22. The method of claim 21, wherein said synchronizing includes timing said relative rotation and said relative reciprocation so that said dead zones are centered on said top dead center and bottom dead center relative reciprocation positions, and said power zones occur between said top dead center and bottom dead center relative reciprocation positions.

23. The method of claim 21, wherein said synchronizing includes timing said relative rotation and said relative reciprocation so that said dead zones are dynamically adjusted in position or size.

24. A magnetic drive apparatus, comprising:

opposing magnet carriers respectively carrying opposing magnet arrangements;

said opposing magnet arrangements having opposing magnetic poles and being configured to produce magnetic interactions when said opposing magnet carriers undergo relative rotation;

said magnetic interactions producing power stroke forces that cause said opposing magnet carriers to undergo relative reciprocation in first and second stroke directions during power zone portions of said relative rotation; and said relative rotation including rotational dead zones wherein said opposing magnetic poles of said opposing magnet arrangements are mutually coaxially aligned to define an equal number of same-polarity and opposite-polarity magnetic interactions.

25. A combination comprising two or more of the magnetic drive apparatus of claim 24 operatively coupled to one or more rotary input components that induce said relative rotation and operatively coupled to a common reciprocal output component that is driven by said relative reciprocation.

* * * * *